(12) United States Patent
Ventrice et al.

(10) Patent No.: US 12,014,389 B2
(45) Date of Patent: *Jun. 18, 2024

(54) SYSTEMS AND METHODS FOR COLLABORATIVE OFFER GENERATION

(71) Applicant: MAPLEBEAR INC., San Francisco, CA (US)

(72) Inventors: Tony Ventrice, Palo Alto, CA (US); Michael Montero, Palo Alto, CA (US); Jamie Rapperport, Palo Alto, CA (US)

(73) Assignee: MAPLEBEAR INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,355

(22) Filed: Mar. 12, 2023

(65) Prior Publication Data

US 2023/0214865 A1 Jul. 6, 2023

Related U.S. Application Data

(63) Continuation of application No. 17/585,526, filed on Jan. 26, 2022, now Pat. No. 11,636,504, which is a
(Continued)

(51) Int. Cl.
*G06Q 30/00* (2023.01)
*G06Q 30/0201* (2023.01)
(Continued)

(52) U.S. Cl.
CPC ..... *G06Q 30/0206* (2013.01); *G06Q 30/0211* (2013.01); *G06Q 30/0255* (2013.01); *G06Q 30/0271* (2013.01)

(58) Field of Classification Search
None
See application file for complete search history.

(56) References Cited

U.S. PATENT DOCUMENTS

| 6,084,583 A | 7/2000 | Gerszberg et al. |
| 6,577,982 B1 | 6/2003 | Erb |

(Continued)

FOREIGN PATENT DOCUMENTS

| WO | WO 94/07239 A1 | 3/1994 |
| WO | WO 2013/055634 A1 | 4/2013 |

(Continued)

OTHER PUBLICATIONS

David; Collaborative Systems Shared Economy; Principles and Case Study; ICCTS 2016, pp. 57-63; 2016.*
(Continued)

*Primary Examiner* — Radu Andrei
(74) *Attorney, Agent, or Firm* — Fenwick & West LLP

(57) ABSTRACT

Systems and methods for a collaborative offer portal is provided. A proposed offer is received from a manufacturer, including an offer structure and a number of consumers they wish to target. Transaction logs of a retailer are accessed to determine an audience for the offer by calculating a return on investment (ROI) for the customer base using the retailer's records given the offer type. The consumers are then grouped by their ROI distribution, and the ROI for the deal is calculated based upon the offer size in light of this distribution. From the offer ROI a discount percentage to be paid by the retailer versus the merchant can be created. The retailer may then choose to accept the offer for deployment.

20 Claims, 25 Drawing Sheets

Related U.S. Application Data continuation of application No. 16/216,997, filed on Dec. 11, 2018, now Pat. No. 11,270,325, which is a continuation-in-part of application No. 16/120,178, filed on Aug. 31, 2018, which is a continuation of application No. 15/990,005, filed on May 25, 2018, now abandoned, which is a continuation-in-part of application No. 14/209,851, filed on Mar. 13, 2014, now Pat. No. 9,984,387.

(60) Provisional application No. 62/576,742, filed on Oct. 25, 2017, provisional application No. 62/553,133, filed on Sep. 1, 2017, provisional application No. 61/780,630, filed on Mar. 13, 2013.

(51) Int. Cl.
*G06Q 30/0211* (2023.01)
*G06Q 30/0251* (2023.01)

(56) References Cited

U.S. PATENT DOCUMENTS

| | | | |
|---|---|---|---|
| 7,092,436 B2 | 8/2006 | Ma et al. | |
| 7,152,040 B1 | 12/2006 | Hawthorne et al. | |
| 7,158,959 B1 | 1/2007 | Chickering et al. | |
| 7,200,527 B1 | 4/2007 | Davidov et al. | |
| 7,254,547 B1 | 8/2007 | Beck et al. | |
| 7,360,698 B1 * | 4/2008 | Wyker | G06Q 30/02 235/383 |
| 7,376,603 B1 | 5/2008 | Mayr et al. | |
| 7,379,890 B2 | 5/2008 | Myr et al. | |
| 7,406,434 B1 | 7/2008 | Chang et al. | |
| 7,639,727 B1 | 12/2009 | Brisebois et al. | |
| 7,660,734 B1 | 2/2010 | Neal et al. | |
| 7,912,748 B1 | 3/2011 | Rosenberg et al. | |
| 7,996,331 B1 | 8/2011 | Solanki et al. | |
| 8,140,381 B1 | 3/2012 | Wu et al. | |
| 8,140,402 B1 | 3/2012 | Mesaros | |
| 8,606,626 B1 | 12/2013 | DeSoto et al. | |
| 8,676,632 B1 | 3/2014 | Watson et al. | |
| 8,972,391 B1 | 3/2015 | McDonnell et al. | |
| 9,418,341 B1 * | 8/2016 | Kadarkarai | G06Q 30/0211 |
| 9,639,842 B1 * | 5/2017 | Green | G06Q 30/016 |
| 9,947,022 B1 | 4/2018 | Shariff et al. | |
| 10,255,620 B1 | 4/2019 | Koren et al. | |
| 10,497,018 B1 | 12/2019 | Sullivan et al. | |
| 10,580,035 B2 | 3/2020 | Mehanian et al. | |
| 2001/0014868 A1 | 8/2001 | Herz et al. | |
| 2001/0018665 A1 | 8/2001 | Sullivan et al. | |
| 2002/0007329 A1 * | 1/2002 | Alcaly | G06Q 40/08 705/35 |
| 2002/0010620 A1 * | 1/2002 | Kowalchuk | G06Q 30/0204 705/7.33 |
| 2002/0023117 A1 | 2/2002 | Bernardin et al. | |
| 2002/0026351 A1 | 2/2002 | Coleman | |
| 2002/0087453 A1 | 7/2002 | Nicolaisen et al. | |
| 2002/0123930 A1 | 9/2002 | Boyd et al. | |
| 2002/0147639 A1 | 10/2002 | Williams et al. | |
| 2002/0161641 A1 | 10/2002 | Quinlan et al. | |
| 2002/0165834 A1 | 11/2002 | Delurgio et al. | |
| 2002/0169700 A1 | 11/2002 | Huffman et al. | |
| 2002/0184086 A1 | 12/2002 | Linde | |
| 2002/0194051 A1 * | 12/2002 | Hall | G06Q 30/0204 707/999.005 |
| 2003/0110074 A1 | 6/2003 | Vives | |
| 2003/0130580 A1 | 7/2003 | Kenyon | |
| 2003/0130883 A1 | 7/2003 | Schroeder et al. | |
| 2003/0149938 A1 | 8/2003 | McElfresh et al. | |
| 2003/0204437 A1 | 10/2003 | Flender et al. | |
| 2003/0233246 A1 | 12/2003 | Snapp et al. | |
| 2004/0073520 A1 * | 4/2004 | Eskandari | G06Q 30/0283 705/400 |
| 2004/0093542 A1 | 5/2004 | Isodono et al. | |
| 2004/0123247 A1 | 6/2004 | Wachen et al. | |
| 2004/0133457 A1 | 7/2004 | Sadiq et al. | |
| 2004/0148211 A1 | 7/2004 | Honarvar et al. | |
| 2004/0210542 A1 * | 10/2004 | Sweeney | G06Q 30/00 705/400 |
| 2004/0223648 A1 | 11/2004 | Hoene et al. | |
| 2004/0249652 A1 | 12/2004 | Aldstadt | |
| 2005/0027594 A1 | 2/2005 | Yasnovsky et al. | |
| 2005/0096963 A1 | 5/2005 | Myr et al. | |
| 2005/0189415 A1 | 9/2005 | Fano et al. | |
| 2005/0201312 A1 | 9/2005 | Archacki | |
| 2005/0246206 A1 | 11/2005 | Obora et al. | |
| 2005/0256778 A1 | 11/2005 | Boyd et al. | |
| 2005/0273376 A1 | 12/2005 | Ouimet et al. | |
| 2005/0273380 A1 | 12/2005 | Schroeder et al. | |
| 2006/0080265 A1 * | 4/2006 | Hinds | G06Q 30/0283 705/400 |
| 2006/0163349 A1 | 7/2006 | Neugebauer | |
| 2006/0167917 A1 | 7/2006 | Solomon | |
| 2006/0259835 A1 | 11/2006 | Marinissen et al. | |
| 2006/0271671 A1 | 11/2006 | Hansen | |
| 2007/0022003 A1 | 1/2007 | Chao et al. | |
| 2007/0038516 A1 * | 2/2007 | Apple | G06Q 30/02 705/14.42 |
| 2007/0073585 A1 * | 3/2007 | Apple | G06Q 30/0247 705/14.46 |
| 2007/0094077 A1 | 4/2007 | Hallbauer et al. | |
| 2007/0094093 A1 | 4/2007 | Hallbauer et al. | |
| 2007/0118419 A1 * | 5/2007 | Maga | G06Q 10/06393 705/7.29 |
| 2007/0143186 A1 | 6/2007 | Apple et al. | |
| 2007/0174030 A1 | 7/2007 | Yun et al. | |
| 2007/0282668 A1 | 12/2007 | Cereghini et al. | |
| 2008/0021909 A1 | 1/2008 | Black et al. | |
| 2008/0033784 A1 | 2/2008 | Chalimadugu et al. | |
| 2008/0033808 A1 | 2/2008 | Black et al. | |
| 2008/0077459 A1 | 3/2008 | Desai et al. | |
| 2008/0126264 A1 | 5/2008 | Tellefsen et al. | |
| 2008/0140502 A1 | 6/2008 | Birnholz et al. | |
| 2008/0189156 A1 | 8/2008 | Voda et al. | |
| 2008/0276270 A1 | 11/2008 | Kotaru et al. | |
| 2008/0305460 A1 * | 12/2008 | Garg | G09B 19/0053 434/118 |
| 2008/0306830 A1 | 12/2008 | Lasa et al. | |
| 2009/0017913 A1 | 1/2009 | Bell et al. | |
| 2009/0030785 A1 | 1/2009 | Goyal et al. | |
| 2009/0030829 A1 | 1/2009 | Chatter et al. | |
| 2009/0083121 A1 * | 3/2009 | Angell | G06Q 30/02 705/7.33 |
| 2009/0132447 A1 | 5/2009 | Milenova et al. | |
| 2009/0204472 A1 | 8/2009 | Einhorn | |
| 2009/0210286 A1 | 8/2009 | Bisdikian | |
| 2009/0254413 A1 | 10/2009 | Chang et al. | |
| 2009/0259523 A1 | 10/2009 | Rapperport et al. | |
| 2009/0271275 A1 | 10/2009 | Regmi et al. | |
| 2009/0282343 A1 | 11/2009 | Catlin et al. | |
| 2009/0288012 A1 | 11/2009 | Hertel et al. | |
| 2009/0295588 A1 | 11/2009 | Duzevik et al. | |
| 2009/0292771 A1 | 11/2009 | Bertoni et al. | |
| 2009/0304232 A1 | 12/2009 | Tsukizawa | |
| 2009/0307073 A1 | 12/2009 | MirrokniBanadaki et al. | |
| 2009/0313109 A1 | 12/2009 | Bous et al. | |
| 2010/0100419 A1 | 4/2010 | Natoli et al. | |
| 2010/0106605 A1 | 4/2010 | Lin et al. | |
| 2010/0145773 A1 | 6/2010 | Desai et al. | |
| 2010/0153332 A1 | 6/2010 | Rollins et al. | |
| 2010/0175084 A1 | 7/2010 | Ellis et al. | |
| 2010/0179855 A1 | 7/2010 | Chen et al. | |
| 2010/0250477 A1 | 9/2010 | Yadav | |
| 2010/0250714 A1 | 9/2010 | Wehmann et al. | |
| 2010/0274661 A1 | 10/2010 | Aaltonen et al. | |
| 2010/0282836 A1 | 11/2010 | Kempf et al. | |
| 2010/0306031 A1 | 12/2010 | McCauley et al. | |
| 2011/0029360 A1 | 2/2011 | Gollapalli | |
| 2011/0035379 A1 | 2/2011 | Chen et al. | |
| 2011/0040756 A1 | 2/2011 | Jones et al. | |
| 2011/0045831 A1 | 2/2011 | Chiu et al. | |
| 2011/0119100 A1 | 5/2011 | Ruhl et al. | |
| 2011/0119155 A1 | 5/2011 | Hammad et al. | |
| 2011/0161113 A1 | 6/2011 | Rumak et al. | |

(56) References Cited

U.S. PATENT DOCUMENTS

| | | | |
|---|---|---|---|
| 2011/0161973 A1* | 6/2011 | Klots | H04L 47/83 |
| | | | 707/705 |
| 2011/0173055 A1 | 7/2011 | Ross et al. | |
| 2011/0196733 A1 | 8/2011 | Li et al. | |
| 2011/0246994 A1 | 10/2011 | Kimbrel et al. | |
| 2011/0251880 A1 | 10/2011 | Butler et al. | |
| 2011/0258049 A1 | 10/2011 | Ramer et al. | |
| 2011/0295722 A1 | 12/2011 | Reisman | |
| 2011/0313835 A1 | 12/2011 | Falkenborg et al. | |
| 2012/0022930 A1 | 1/2012 | Brouhard | |
| 2012/0022938 A1 | 1/2012 | McNea et al. | |
| 2012/0022944 A1 | 1/2012 | Volpi | |
| 2012/0100134 A1 | 4/2012 | Lenz | |
| 2012/0150576 A1 | 6/2012 | Wagenblatt | |
| 2012/0158099 A1 | 6/2012 | Lee | |
| 2012/0158474 A1 | 6/2012 | Fahner et al. | |
| 2012/0191534 A1 | 7/2012 | Tavares et al. | |
| 2012/0221372 A1 | 8/2012 | Vasko | |
| 2012/0239537 A1 | 9/2012 | Baker et al. | |
| 2012/0259698 A1 | 10/2012 | Yurow | |
| 2012/0264089 A1 | 10/2012 | Hoang et al. | |
| 2012/0290399 A1 | 11/2012 | England et al. | |
| 2012/0303411 A1 | 11/2012 | Chen et al. | |
| 2013/0006949 A1 | 1/2013 | Essawi et al. | |
| 2013/0013404 A1 | 1/2013 | Suprock et al. | |
| 2013/0030868 A1 | 1/2013 | Lyon et al. | |
| 2013/0036015 A1* | 2/2013 | Bender | G06Q 30/0269 |
| | | | 705/14.66 |
| 2013/0046605 A1 | 2/2013 | Baron et al. | |
| 2013/0073388 A1 | 3/2013 | Heath | |
| 2013/0085838 A1 | 4/2013 | Tennenholtz et al. | |
| 2013/0085844 A1 | 4/2013 | Neystadt et al. | |
| 2013/0091019 A1 | 4/2013 | Mallon et al. | |
| 2013/0097006 A1 | 4/2013 | Evans et al. | |
| 2013/0110641 A1 | 5/2013 | Ormont et al. | |
| 2013/0110880 A1 | 5/2013 | Farchi et al. | |
| 2013/0124257 A1 | 5/2013 | Schubert | |
| 2013/0124361 A1 | 5/2013 | Bryson | |
| 2013/0138812 A1 | 5/2013 | Assuncao et al. | |
| 2013/0148813 A1 | 6/2013 | Strelcyk et al. | |
| 2013/0151332 A1 | 6/2013 | Yan et al. | |
| 2013/0185147 A1 | 7/2013 | Letca et al. | |
| 2013/0226691 A1 | 8/2013 | Chatow et al. | |
| 2013/0238416 A1 | 9/2013 | Richard | |
| 2013/0238617 A1 | 9/2013 | Postrel | |
| 2013/0246217 A1 | 9/2013 | Denton et al. | |
| 2013/0254151 A1 | 9/2013 | Mohagheghi et al. | |
| 2013/0290096 A1 | 10/2013 | Lizotte | |
| 2013/0297543 A1 | 11/2013 | Treiser | |
| 2013/0331999 A1 | 12/2013 | Vaughn et al. | |
| 2013/0346302 A1 | 12/2013 | Purves et al. | |
| 2014/0006129 A1 | 1/2014 | Heath | |
| 2014/0019228 A1 | 1/2014 | Aggarwal et al. | |
| 2014/0025391 A1 | 1/2014 | Knowles et al. | |
| 2014/0040007 A1 | 2/2014 | Relyea et al. | |
| 2014/0046757 A1 | 2/2014 | Kahn et al. | |
| 2014/0046872 A1 | 2/2014 | Arnott et al. | |
| 2014/0074595 A1* | 3/2014 | Chomsky | G06Q 30/0211 |
| | | | 705/14.45 |
| 2014/0081636 A1 | 3/2014 | Erhart et al. | |
| 2014/0081722 A1 | 3/2014 | Schacht | |
| 2014/0081741 A1 | 3/2014 | Katsur | |
| 2014/0095281 A1 | 4/2014 | Weiss et al. | |
| 2014/0095410 A1* | 4/2014 | Chen | H02J 13/00006 |
| | | | 705/412 |
| 2014/0095611 A1 | 4/2014 | Weinstein et al. | |
| 2014/0122200 A1 | 5/2014 | Granville | |
| 2014/0136537 A1 | 5/2014 | Nelson et al. | |
| 2014/0143405 A1 | 5/2014 | Pavlidis et al. | |
| 2014/0180790 A1 | 6/2014 | Boal | |
| 2014/0180809 A1 | 6/2014 | Boal | |
| 2014/0180811 A1* | 6/2014 | Boal | G06Q 20/209 |
| | | | 705/14.53 |
| 2014/0236706 A1 | 8/2014 | Opie et al. | |
| 2014/0278786 A1 | 9/2014 | Liu-Qiu-Yan | |
| 2014/0278798 A1 | 9/2014 | Goyal et al. | |
| 2014/0330633 A1 | 11/2014 | Moran et al. | |
| 2014/0330636 A1 | 11/2014 | Moran et al. | |
| 2014/0337120 A1 | 11/2014 | Ercanbrack | |
| 2014/0344051 A1* | 11/2014 | Ouimet | G06Q 30/0247 |
| | | | 705/14.46 |
| 2015/0019325 A1 | 1/2015 | Li et al. | |
| 2015/0049924 A1 | 2/2015 | Tang et al. | |
| 2015/0050970 A1 | 2/2015 | Racho | |
| 2015/0058087 A1 | 2/2015 | Kulagin et al. | |
| 2015/0117631 A1 | 4/2015 | Tuchman et al. | |
| 2015/0142557 A1 | 5/2015 | Krishnamurthy et al. | |
| 2015/0150023 A1 | 5/2015 | Johnson et al. | |
| 2015/0248630 A1 | 9/2015 | Ramanan et al. | |
| 2015/0310188 A1 | 10/2015 | Ford et al. | |
| 2015/0317682 A1 | 11/2015 | Kayser et al. | |
| 2015/0332208 A1 | 11/2015 | Scott et al. | |
| 2015/0332308 A1* | 11/2015 | Liu | G06Q 30/0242 |
| | | | 705/14.41 |
| 2016/0155193 A1 | 6/2016 | Merrill et al. | |
| 2016/0162931 A1 | 6/2016 | Harik et al. | |
| 2016/0189278 A1 | 6/2016 | Parpia et al. | |
| 2017/0032407 A1 | 2/2017 | Moran | |
| 2017/0053305 A1 | 2/2017 | Montero et al. | |
| 2017/0098257 A1 | 4/2017 | Keller | |
| 2017/0109767 A1 | 4/2017 | Shpanya et al. | |
| 2017/0140603 A1 | 5/2017 | Ricci | |
| 2017/0161791 A1 | 6/2017 | Zaheer et al. | |
| 2017/0249664 A1 | 8/2017 | Harik et al. | |
| 2017/0345096 A1* | 11/2017 | Umblijs | G06Q 40/06 |
| 2018/0068340 A1 | 3/2018 | Jaidka et al. | |
| 2018/0108035 A1* | 4/2018 | Tiwari | G06F 16/285 |
| 2018/0211272 A1 | 7/2018 | Deshpande et al. | |
| 2018/0336597 A1 | 11/2018 | Singh et al. | |
| 2018/0341897 A1 | 11/2018 | Ames | |
| 2019/0080361 A1 | 3/2019 | Green | |
| 2019/0108538 A1 | 4/2019 | Montero et al. | |
| 2019/0147425 A1 | 5/2019 | Sundholm | |
| 2019/0180302 A1 | 6/2019 | Ventrice et al. | |
| 2019/0347681 A1 | 11/2019 | Liu et al. | |
| 2020/0019922 A1 | 1/2020 | Harsha et al. | |
| 2021/0103945 A1 | 4/2021 | Montero et al. | |
| 2021/0110429 A1 | 4/2021 | Keng et al. | |
| 2021/0142387 A1 | 5/2021 | Gupta et al. | |

FOREIGN PATENT DOCUMENTS

| | | |
|---|---|---|
| WO | WO 2018/200546 A1 | 11/2018 |
| WO | WO 2018/213019 A1 | 11/2018 |

OTHER PUBLICATIONS

Huang; Strategy_Model_and_Platform_for_Collaborative_Commerce; IEEE; pp. 304-311; 2007.*

Boughzala, I. et al. "Characterization and Evaluation of Serious Games: A Perspective of Their Use in Higher Education," 46th Hawaii International Conference on System Sciences, Jan. 7-10, 2013, pp. 844-852.

Campbell, N. R. "Physics: The Elements," Cambridge University Press, 1920, pp. 267-293.

Chen, J. et al., "Deep CTR Prediction in Display Advertising" MM '16: Proceedings of the 24th ACM international conference on Multimedia, Oct. 2016, pp. 811-820.

Dumitrascu, B. et al. "PG-TS: Improved Thompson Sampling for Logistic Contextual Bandits," Advances in Neural Information Processing Systems, 32nd Conference on Neural Information Processing Systems, Montreal, Canada, 2018, pp. 1-10.

European Patent Office, Extended European Search Report and Opinion, EP Patent Application No. 19871600.3, dated May 25, 2022, eight pages.

European Patent Office, Extended European Search Report and Opinion, EP Patent Application No. 18851705.6, dated Jan. 15, 2021, seven pages.

Fasuga, R. et al. "An Intelligent Tool for All-to-All Sales on the Internet: Platform for Compilation of Commercial Offers and Requests

(56) References Cited

OTHER PUBLICATIONS for Companies and Customers," 12th International Joint Conference on e-Business and Telecommunications, Jul. 20-22, 2015, pp. 263-270.
Goebel, C. et al. "The Information Value of Item-Level RFID in Retail Supply Chain Operations," 44th Hawaii International Conference on System Sciences, Feb. 2011, pp. 1-10.
Green, P. et al. "Conjoint Analysis in Consumer Research: Issues and Outlook," Journal of Consumer Research, vol. 5, No. 2, Sep. 1978, pp. 103-123.
Hoch, S. J. et al. "Determinants of Store-Level Price Elasticity," Journal of Marketing Research, vol. 32, No. 1, Feb. 1995, pp. 17-29.
Madansky, A. "On Conjoint Analysis and Quantal Choice Models," University of Chicago Press, Journal of Business, vol. 53, No. 3, Jul. 1980, pp. S37-S44.
Molina, A. et al., "Next-generation manufacturing systems: key research issues in developing and integrating reconfigurable and intelligent machines," International Journal of Computer Integrated Manufacturing, Feb. 19, 2007, pp. 525-536.
Nafari, M. et al. "A Data Mining Approach for Finding Optimal Discount of Retail Assortments," 11th International Conference on Computer and Information Technology, Dec. 24-28, 2008, pp. 20-27.
PCT International Search Report and Written Opinion, PCT Application No. PCT/US2018/030985, dated Aug. 24, 2018, 7 pages.
PCT International Search Report and Written Opinion, PCT Application No. PCT/US2018/057409, dated Jan. 16, 2019, 6 pages.
PCT International Search Report and Written Opinion, PCT Application No. PCT/US2019/055259, dated Dec. 26, 2019, 15 pages.
Rao, V. R. "Applied Conjoint Analysis," New York: Springer, 2014.
Schrage, M. "The Innovator's Hypothesis: How Cheap Experiments Are Worth More Than Good Ideas," MIT Press, 2014, pp. 103-111.
Sen, S. et al. "Incentivizing Time-Shifting of Data: A Survey of Time-Dependent Pricing for Internet Access," IEEE Communications Magazine, vol. 50, No. 11, Nov. 2012, pp. 91-99.
United States Office Action, U.S. Appl. No. 17/676,095, dated Mar. 16, 2023, 25 pages.
United States Office Action, U.S. Appl. No. 16/670,402, dated Mar. 16, 2023, 23 pages.
United States Office Action, U.S. Appl. No. 16/120,178, dated Mar. 16, 2023, 37 pages.
United States Office Action, U.S. Appl. No. 17/076,802, dated Feb. 17, 2023, 20 pages.
United States Office Action, U.S. Appl. No. 17/749,041, dated Jan. 30, 2023, 30 pages.
United States Office Action, U.S. Appl. No. 17/076,802, dated Jul. 12, 2022, 12 pages.
United States Office Action, U.S. Appl. No. 17/076,802, dated Mar. 30, 2022, 18 pages.
United States Office Action, U.S. Appl. No. 17/240,299, dated Mar. 14, 2022, 19 pages.
United States Office Action, U.S. Appl. No. 17/240,299, dated Sep. 19, 2022, 21 pages.
United States Office Action, U.S. Appl. No. 17/573,620, dated Aug. 3, 2022, 21 pages.
United States Office Action, U.S. Appl. No. 17/585,526, dated Nov. 28, 2022, six pages.
United States Office Action, U.S. Appl. No. 16/120,178, dated Aug. 4, 2021, 24 pages.
United States Office Action, U.S. Appl. No. 16/120,178, dated Jan. 21, 2021, 26 pages.
United States Office Action, U.S. Appl. No. 16/120,178, dated Jun. 24, 2022, 25 pages.
United States Office Action, U.S. Appl. No. 16/120,178, dated Mar. 16, 2022, 24 pages.
United States Office Action, U.S. Appl. No. 16/120,178, dated Mar. 5, 2020, 27 pages.
United States Office Action, U.S. Appl. No. 16/120,178, dated Nov. 1, 2019, 27 pages.
United States Office Action, U.S. Appl. No. 16/120,178, dated Nov. 8, 2021, 24 pages.
United States Office Action, U.S. Appl. No. 16/120,178, dated Sep. 14, 2020, 26 pages.
David, B. et al. "Collaborative Systems & Shared Economy (Uberization): Principles & Case Study," International Conference on Collaboration Technologies and Systems, 2016, pp. 57-63.
Huang, S. et al. "Strategy, Model, and Platform for Collaborative Commerce," IEEE International Conference on e-Business Engineering, Oct. 24-26, 2007, pp. 304-311.
Katsov, I. et al., "Predictive analytics for promotion and price optimization," Aug. 7, 2018, pp. 1-18, [Online] [Retrieved on Oct. 19, 2022] Retrieved from the Internet <URL: https://blog.griddynamics.com/predictive-analytics-for-promotion-and-price-optimization/>.
PCT International Search Report and Written Opinion, PCT Application No. PCT/US2018/049284, dated Nov. 30, 2018, 8 pages.
PCT International Search Report and Written Opinion, PCT Application No. PCT/US22/12206, dated Apr. 12, 2022, 22 pages.
PCT International Search Report and Written Opinion, PCT Application No. PCT/US22/30392, dated Sep. 9, 2022, 12 pages.
United States Office Action, U.S. Appl. No. 17/665,504, dated Oct. 21, 2022, nine pages.
United States Office Action, U.S. Appl. No. 17/670,402, dated Nov. 28, 2022, 14 pages.
United States Office Action, U.S. Appl. No. 16/120,178, dated Nov. 28, 2022, 19 pages.
United States Office Action, U.S. Appl. No. 17/676,095, dated Nov. 29, 2022, 13 pages.
Goldberg, S. et al. "Conjoint analysis of price premiums for hotel amenities," *Journal of Business*, Jan. 1, 1984, pp. S111-S132.
Liu, X. "Dynamic coupon targeting using batch deep reinforcement learning: An application to livestream shopping," *Marketing Science*, vol. 42, No. 4, Jul. 2023, 62 pages.
United States Office Action, U.S. Appl. No. 18/159,249, dated Oct. 26, 2023, 31 pages.
United States Office Action, U.S. Appl. No. 17/749,041, dated Oct. 19, 2023, 25 pages.
United States Office Action, U.S. Appl. No. 17/749,041, dated May 11, 2023, 34 pages.

\* cited by examiner

SYSTEMS AND METHODS FOR COLLABORATIVE OFFER GENERATION

CROSS REFERENCE TO RELATED APPLICATIONS

This continuation application claims the benefit of U.S. application Ser. No. 17/585,526, filed Jan. 26, 2022, currently allowed, which claims the benefit of U.S. application Ser. No. 16/216,997 filed Dec. 11, 2018, now U.S. Pat. No. 11,270,325, which is a continuation-in-part application and claims the benefit of U.S. application Ser. No. 16/120,178, filed Aug. 31, 2018, which is a continuation application and claims the benefit of U.S. application Ser. No. 15/990,005, filed May 25, 2018, abandoned, which is a continuation-in-part application and claims the benefit of U.S. application Ser. No. 14/209,851, filed Mar. 13, 2014, now U.S. Pat. No. 9,984,387, which claims priority under 35 U.S.C. 119(e) to a commonly owned U.S. Provisional Application No. 61/780,630, filed Mar. 13, 2013, expired. Application Ser. No. 15/990,005 also claims the benefit of U.S. Provisional Application No. 62/576,742, filed Oct. 25, 2017, expired. Additionally, U.S. application Ser. No. 16/120,178 claims priority to U.S. Provisional Application No. 62/553,133, filed Sep. 1, 2017, expired.

The present invention is additionally related to the following applications and patents, all of which are incorporated herein by reference:

Commonly owned U.S. application Ser. No. 14/231,426, filed on Mar. 31, 2014, entitled "Adaptive Experimentation and Optimization in Automated Promotional Testing," by Moran et al., now U.S. Pat. No. 10,438,230 issued Oct. 8, 2019.

Commonly owned U.S. application Ser. No. 14/231,432, filed on Mar. 31, 2014, entitled "Automated and Optimal Promotional Experimental Test Designs Incorporating Constraints," by Moran et al., now U.S. Pat. No. 9,940,639 issued Apr. 10, 2018.

Commonly owned U.S. application Ser. No. 14/231,440, filed on Mar. 31, 2014, entitled "Automatic Offer Generation Using Concept Generator Apparatus and Methods Therefor," by Moran et al., now U.S. Pat. No. 10,438,231, issued Oct. 8, 2019.

Commonly owned U.S. application Ser. No. 14/231,442, filed on Mar. 31, 2014, entitled "Automated Event Correlation to Improve Promotional Testing," by Moran et al., now U.S. Pat. No. 9,940,640 issued Apr. 10, 2018.

Commonly owned U.S. application Ser. No. 14/231,460, filed on Mar. 31, 2014, entitled "Automated Promotion Forecasting and Methods Therefor," by Moran et al., now U.S. Pat. No. 10,445,763, issued Oct. 15, 2019.

Commonly owned U.S. application Ser. No. 14/231,555, filed on Mar. 31, 2014, entitled "Automated Behavioral Economics Patterns in Promotion Testing and Methods Therefor," by Moran et al., now U.S. Pat. No. 10,140,629 issued Nov. 27, 2018.

All the applications/patents listed above are incorporated herein in their entirety by this reference.

BACKGROUND

The present invention relates generally to price optimization methods and apparatus therefor. More particularly, the present invention relates to computer-implemented methods and computer-implemented apparatus for the generation of promotions through a facilitation of the manufacturer and retailer relationship to deliver optimal promotion structure. The systems and methods likewise provide means for then democratizing the redemption of a coupon or offer on the backend, thereby providing retailers and manufacturers greater reach to their consumers.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (e.g., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In addition to promotional activities, it is also desirable to perform optimizations of base pricing (e.g. non-promotional prices). Often retailers rely upon manufacturer's suggested retail pricing (MSRP) for setting of base prices. In other circumstances, base prices are set based upon competitive analysis—a retailer may monitor competitor's and match or beat the competitor's price on some or all the goods in a store. Alternatively, some retailers may set a desired margin, or sales volume, for a good, and set prices accordingly. Generally however, the base prices of goods in a brick-and-mortar store do not vary significantly due to logistical concerns of updating signage and point of sales (POS) databases, consumer expectation of generally consistent base prices, and the tendency that a retailer will continue patterns of behavior (e.g., "this is what we have always done").

In discussing various embodiments of the present invention, the sale of consumer packaged goods (hereinafter "CPG") is employed to facilitate discussion and ease of understanding. It should be kept in mind, however, that the promotion and base pricing optimization methods and apparatuses discussed herein may apply to any industry in which there is any pricing flexibility in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion and base price testing is expensive (in terms of, for example, the effort to conduct a promotion campaign, modify display prices and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion and base price optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type when analyzing for promotions (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take some of these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

In addition to all of the issues intrinsic to effective promotional design and testing, there is also a significant cost associated with the negotiation of a promotion between a given producer and the retailer. Product manufacturers have goals to increase market share of their goods, increase sales volumes or improve profits. To this end, manufacturers will often generate pricing incentives to the retailers for their goods, in hopes to drive additional sales. This may be completed, most commonly, through personalized mailers or loyalty card offers.

In personalized mailers the manufacturer may simply institute a manufacturer's coupon that may be redeemed at the retailer by the consumer. The retailer then physically mails these coupons to the manufacturer for reimbursement. Such manufacturer incentives are often plagued by counterfeit coupons, and places the entire cost reduction burden upon the manufacturer. Since the manufacturer must absorb all this cost, and due to the fact that the manufacturer is lower on the supply chain (and thus subject to generally lower margins) these manufacturer rebates are generally small in value, and lack significant effectiveness.

A much more impactful manner of promoting the products with personalized mailers is through a joint promotional activity between the retailer and manufacturer. In these situations, both the retailer and manufacturer agree to promotion terms, and each bear some of the cost burden associated with the promotion. This allows much deeper discounts to be offered to the consumer, which tends to be the more effective. However, these arrangements require coordination, negotiation and agreement between the retailer and the manufacturer.

Currently, for personalized mailers, an expensive third party consultant operates on behalf of retailers to seek offers from product manufacturers. These consultant third parties charge significant fees to identify segments of goods and consumers, and plan a possible promotion. There is very little visibility by either the manufacturer or the retailer into this process generally. From this consulting, a limited number of promotions are then generated (usually less than 8 'personalized' offers), and are generally delivered to the possible consumers using the postal service, or other slow delivery mechanism.

The usage of paper promotions that are delivered to a rather granular segment of consumers is generally subject to fraud risk due to fake coupon barcodes. Analytics resulting from the personalized promotion are collected by the consultant, and again remain opaque to the manufacturer and retailer. These current personalized mailers are slow, relatively ineffective, costly and non-transparent.

The usage of loyalty card promotions reduces the risks associated with fraudulent activity and the slow delivery issue. In loyalty card promotions the retailer charges the manufacturer for the placement of a promotion on their products. The retailer sets the terms of the promotion, and does in an ad hoc manner. Although significant data if available in the form of transaction logs, the retailers are generally overwhelmed by data, and the promotion design is suboptimal, particularly for the manufacturer.

The resulting promotions are published by the retailer specific loyalty card platform, and typically includes delays and fees before the offer is communicated to the consumer base. On the consumer side, many consumers do not enjoy using a personalized application, and less than 20% of consumers use a loyalty card application. Thus, the reach of these offers is significantly reduced compared to mailers. Backend analytics for the promotions are available to the retailer, but still remains opaque to the manufacturer.

On the redemption side of these offers, the usage of a loyalty card system locks a user into the specific retailer's application platform. Since consumers generally shop at a wide variety of retailers, the consumer must download and manage a number of these applications, leading, in part, to the low usage rates of these applications.

Previous disclosures by the applicants have focused upon the ability to generate and administer a plurality of test promotions across consumer segments in a rapid manner in order to overcome the foregoing issues in a manner that results in cost-effective, high-return, and timely promotions to the general public. They provide a very powerful tool in determining the most effective promotional values, but do not specifically address the promotion generation process between the retailer and manufacturer, nor the redemption of said promotions.

It is therefore apparent that an urgent need exists for systems and methods that enable improvements in the generation of promotion offers between the retailers and manufacturers, as well as mechanisms to improve redemption of said promotions.

SUMMARY

To achieve the foregoing and in accordance with the present invention, systems and methods for a collaborative offer portal is provided. In some embodiments, a proposed offer is received from a manufacturer, including an offer structure and a number of consumers they wish to target. Transaction logs of a retailer are accessed to determine an audience for the offer by calculating a return on investment (ROI) for the customer base using the retailer's records given the offer type.

The consumers are then grouped by their ROI distribution, and the ROI for the deal is calculated based upon the offer size in light of this distribution. From the offer ROI a discount percentage to be paid by the retailer versus the merchant can be created. The retailer may then choose to accept the offer for deployment.

Manufacturer costs can be calculated based upon the offer structure, number of consumers to target, and the discount percentage. Also, predicted redemption rate for the offer, predicted sales responsive to the predicted redemption rate, predicted incremental sales, and gross margin estimates may all be calculated.

The ROI value for a product is calculated using product headroom, product importance and shopper headroom calculated using weights received from the retailer and transaction log data. The discount percentage is linearly correlated to the average ROI value.

In some cases the system can optimize the offer structure by maintaining the product, and proposing variable values for the offer that have been previously tested and determined to be winning values. The discount variable value is constrained such that the value deviates less than 10% from a value of the proposed offer. It is also possible to optimize spend for the offer by determining an optimal number of consumers to target by maximizing the consumer numbers subject to a maximum budget value and minimum average ROI value.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
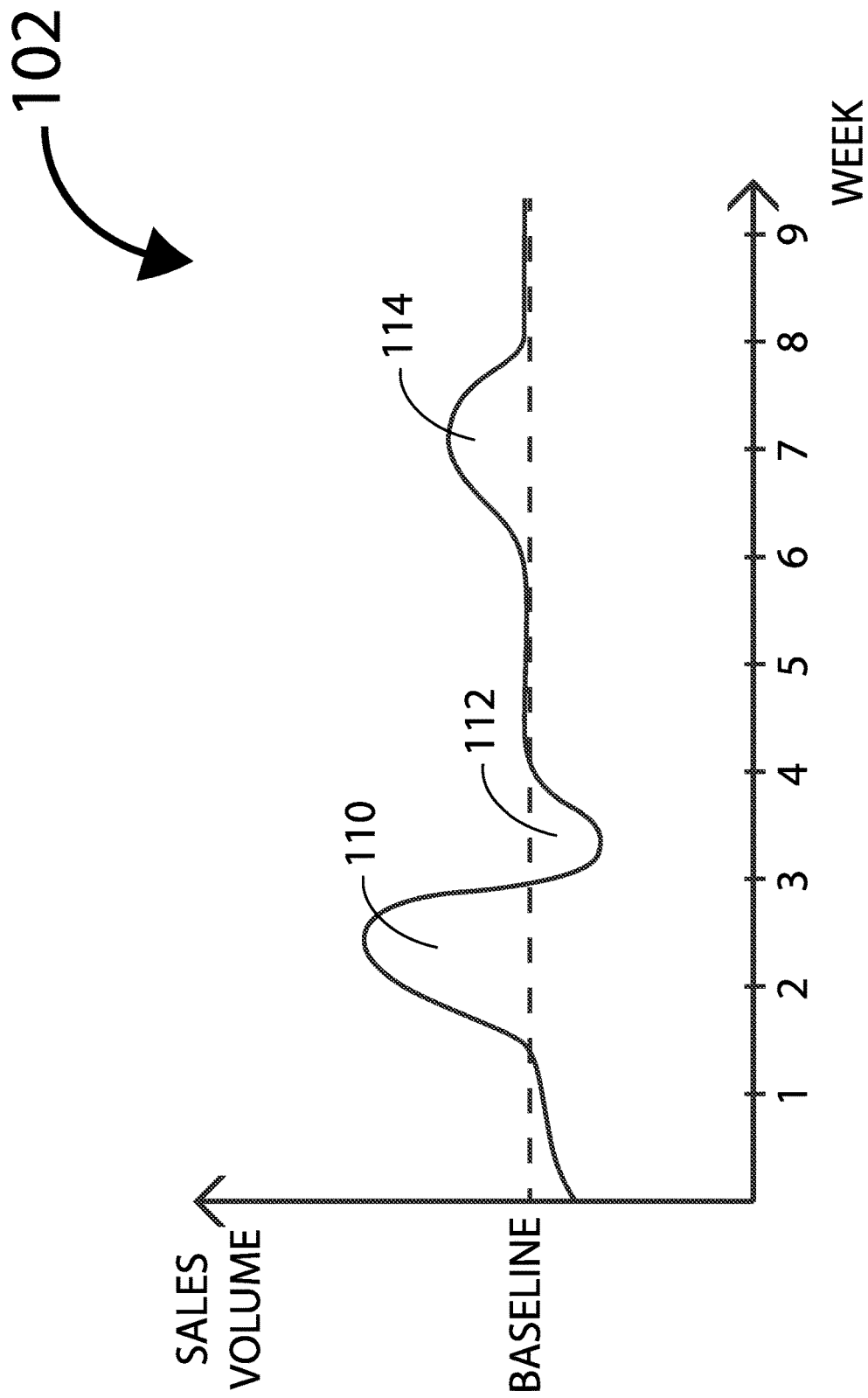
FIG. 1 shows an example demand curve 102 for Brand X cookies over some period of time.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to the generation of promotions between a manufacturer and one or more retailers. In this application the term "manufacturer" may include the actual producer of a good, or could include resellers or intermediate branding entities. The term "retailer" refers to a business entity that is offering the good or service to consumers directly, or less commonly to yet another downstream business entity. Examples of manufacturers could include, for example, a soda bottling plant, a consumer package good (CPG) producer, or a wholesale retailer. Examples of retailers, in contrast include main-street stores, such as Target, Safeway, Walmart and the like.

Historically, third party consultants are used to generate personalized mailers when a joint manufacturer/retailer promotion was undertaken. This has been further augmented through the usage of loyalty card applications which also allow specific promotions to be delivered to specific consumers. Such systems and methods are costly, ineffective, and opaque to manufacturers. The presently disclosed systems and methods allows for a far more efficient and transparent mechanism for the generation, delivery and redemption of personalized promotional offers. Such systems and methods may be coupled to the disclosed methodologies for promotional testing to further improve the effectiveness of such offers.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Forward Looking Promotion Optimization

Within the forward-looking promotion optimization, revealed preferences are obtained when the individual consumers respond to specifically designed actual test promotions. The revealed preferences may be tracked in individual computer-implemented accounts (which may, for example, be implemented via a record in a centralized database and rendered accessible to the merchant or the consumer via a computer network such as the internet) associated with individual consumers, or may be collected at a physical retailer based upon transaction records. For example, when a consumer responds, using his smart phone, web browser, or in a physical store through completion of a transaction, to a test promotion that offers 20% off a particular consumer packaged goods (CPG) item, that response is tracked in his individual computer-implemented account, or in a transaction record. Such computer-implemented accounts may be implemented via, for example, a loyalty card program, apps on a smart phone, computerized records, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion. In the event of physical testing in a retailer space, it may be possible to segment the consumer base using a variety of collected demographic and activity data. This may include a loyalty care program, pharmacy ID, and information collected from public data sources. Such information may be correlated to credit card (or debit card, electronic wallet, etc.) information, and stored as a profile for the individual consumer and aggregated into consumer households. Information about the consumer, or the household, such as purchasing behaviors, income levels, ethnicity, age(s), number of persons in the household, gender, political affiliations, geography, medical conditions, etc., may be used to categorize the consumers into like subpopulations using neural network techniques and known clustering algorithms.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. In the physical retailer space, if a consumer stops to look at a product, or even pick up the product but chooses not to purchase it at the register, such activity, to the extent it is reliably measured, may indicate interest in the promotion despite the lack of a transaction being completed. Different types of responses/actions by the consumers may be accorded different weights, in one or more embodiments.

As noted, the groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics, geography (e.g., purchasing at a certain brick and mortar retailer) are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best, or well, with respect to test promotion responses. In this manner, test promotion response analysis provides insights not only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, promotion broadly transmitted or made available to members of the public, and/or promotions that are rolled out to a wider set of physical retailer locations. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (e.g., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (e.g., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public promotion is obtained even before the proposed general public promotion is released to the public. This is one key driver in obtaining highly effective general public promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts. In following sections one mechanism, the design matrix, for the automation of promotional generation will be provided in greater detail.

In one or more embodiments, once a set of concepts is developed, the technology advantageously a) will constrain offers to only test "viable promotions", e.g., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media site (e.g., Facebook™, Twitter™, Google+™, etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

Figure 2A:
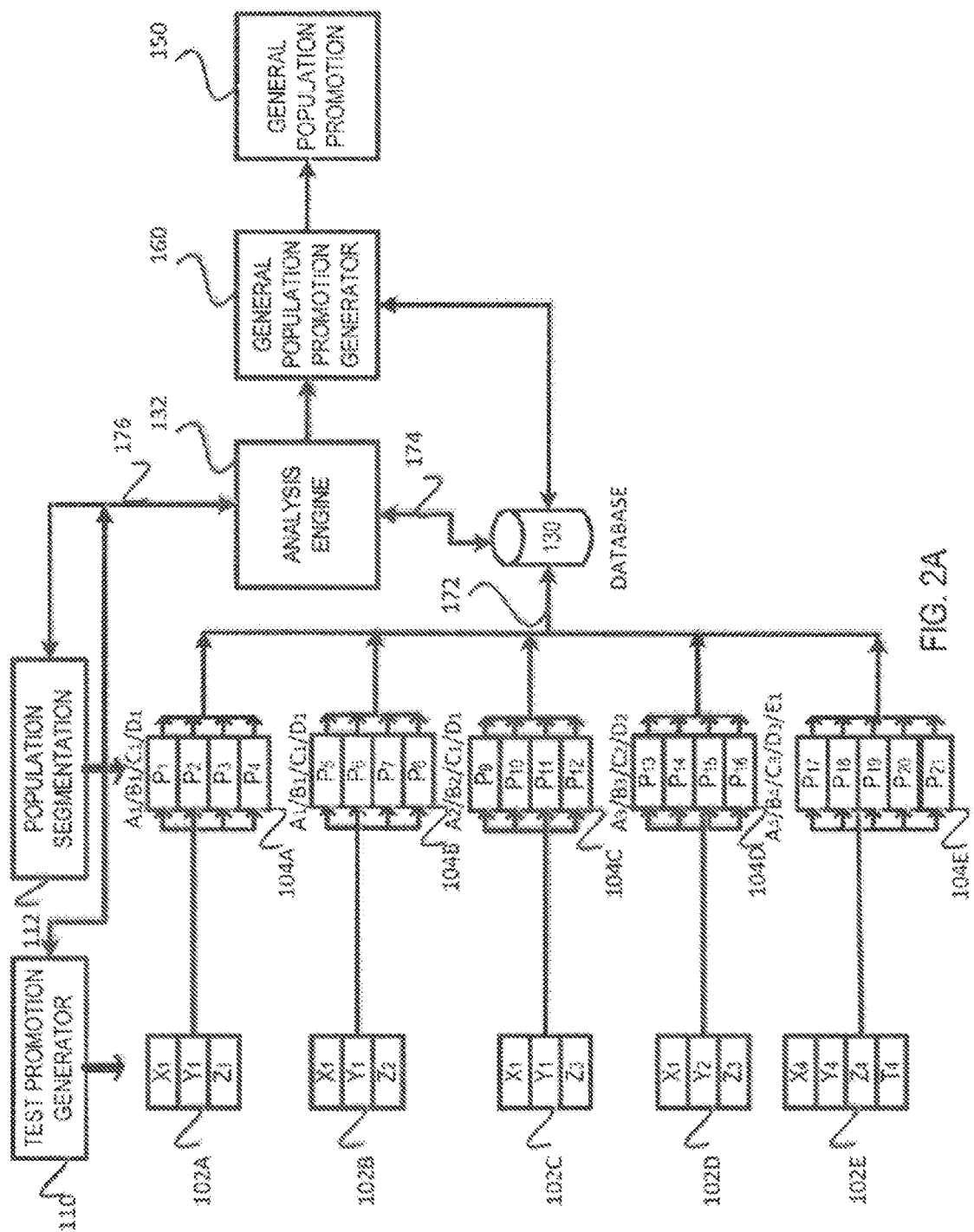
FIG. 2A shows, in accordance with an embodiment of the invention, a conceptual drawing of the forward-looking promotion optimization method.

FIG. 2A shows, in accordance with an embodiment of the invention, a conceptual drawing of the forward-looking promotion optimization method. As shown in FIG. 2A, a plurality of test promotions 102a, 102b, 102c, 102d, and 102e are administered to purposefully segmented subpopulations 104a, 104b, 104c, 104d, and 104e respectively. As mentioned, each of the test promotions (102a-102e) may be designed to test one or more test promotion variables.

In the example of FIG. 2A, test promotions 102a-102d are shown testing three test promotion variables X, Y, and Z, which may represent for example the size of the packaging (e.g., 12 oz. versus 16 oz.), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion 102e is shown testing four test promotion variables (X, Y, Z, and T).

One or more of the test promotion variables may vary from test promotion to test promotion. In the example of FIG. 2A, test promotion 102a involves test variable X1 (representing a given value or attribute for test variable X) while test promotion 102b involves test variable X2 (representing a different value or attribute for test variable X). A test promotion may vary, relative to another test promotion, one test promotion variable (as can be seen in the comparison between test promotions 102a and 102b) or many of the test promotion variables (as can be seen in the comparison between test promotions 102a and 102d). Also, there are no requirements that all test promotions must have the same number of test promotion variables (as can be seen in the comparison between test promotions 102a and 102e) although for the purpose of validating the effect of a single variable, it may be useful to keep the number and values of other variables (e.g., the control variables) relatively constant from test to test (as can be seen in the comparison between test promotions 102a and 102b).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations 104a-104d are shown segmented using four segmentation criteria A, B, C, D, which may represent for example the age of the consumer, the household income, the zip code, group of consumers shopping at a particular physical retailer, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations 104a-104d in the example of FIG. 2A, segmentation may involve as many or as few of the segmentation criteria as desired. For example, purposefully segmented subpopulation 104e is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (e.g., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can be recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations, or a limited number of physical locations for a limited time, would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc. can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
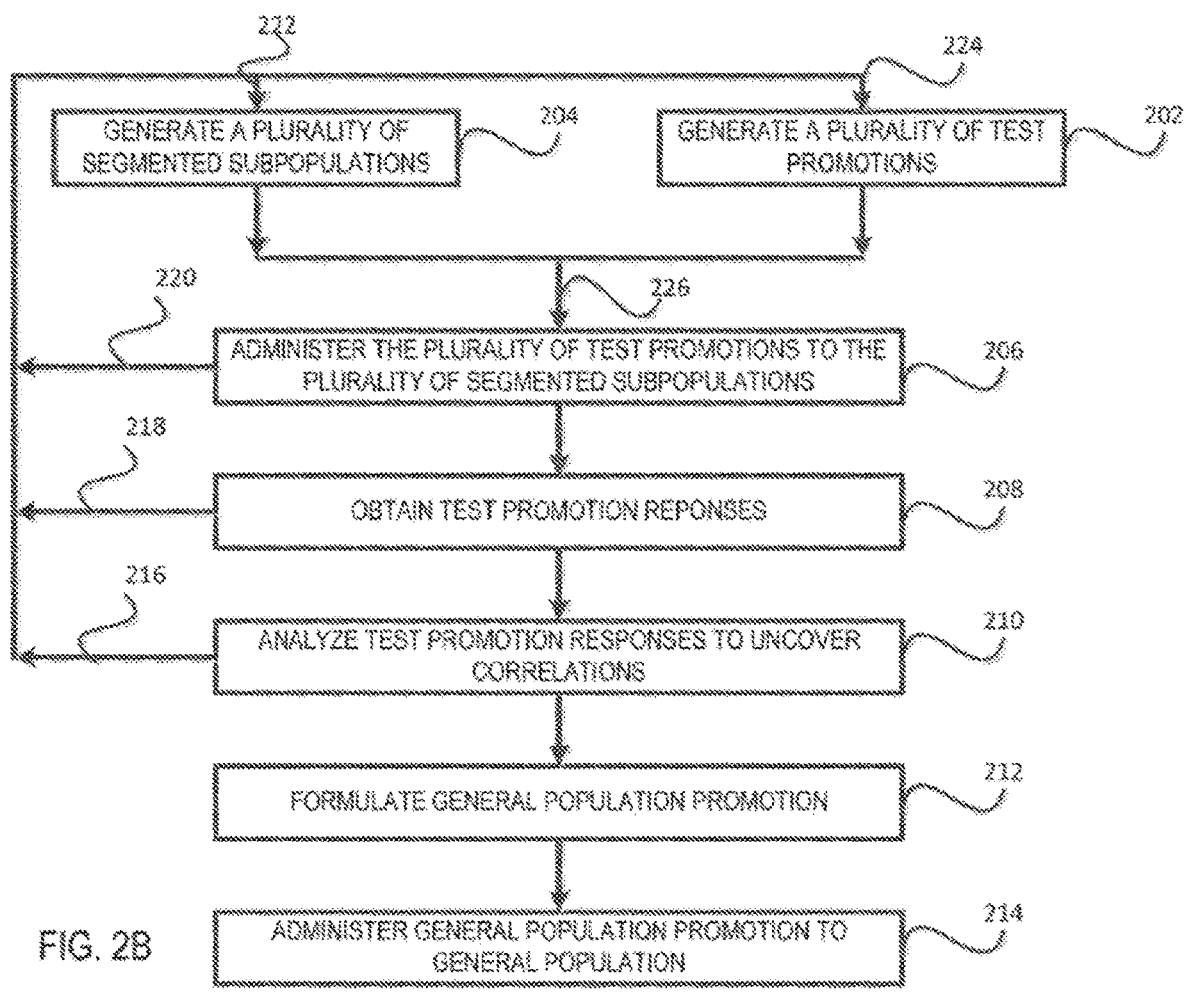
FIG. 2B shows, in accordance with an embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses in an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. In some alternate embodiments, as will be discussed in greater detail below, the test promotions may be administered via electronic pricing tags displayed within a physical retail location. Such physical test promotions may be constricted by deployment time due to logistic considerations. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysis engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
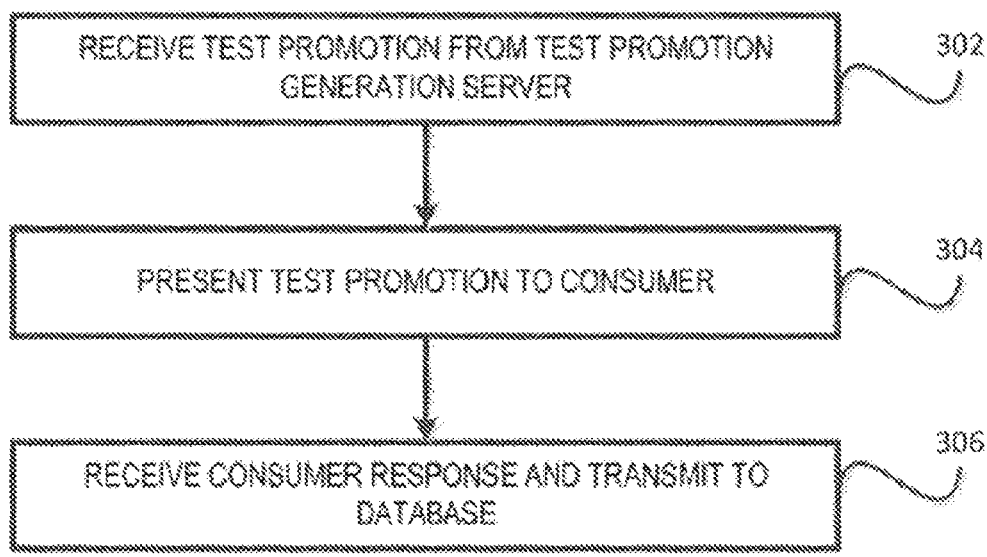
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.), in a computer-implemented account (such as a loyalty program account) associated with the user that is a member of the segmented subpopulation to be tested, via one or more social media sites, or displayed on electronic pricing tags within a retailer's physical store. In step 304, the test promotion is presented to the user. In step 306, the user's response to the test promotion is obtained and transmitted to a database for analysis.

Figure 3B:
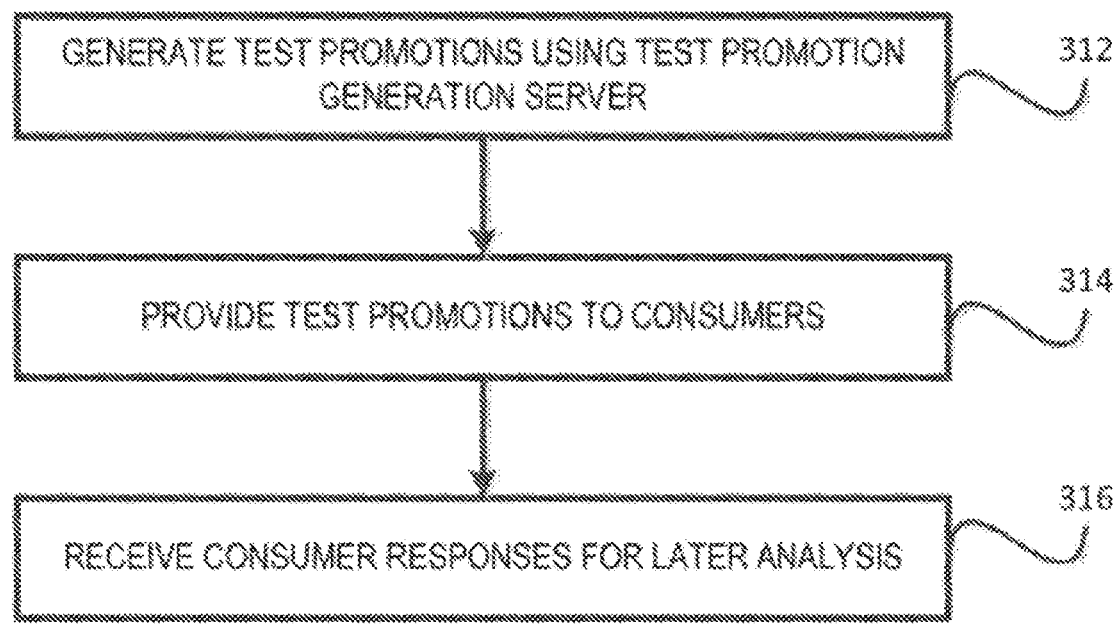
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer, shared with the user using the user's loyalty account, displayed in the physical retailer). In step 316, the system receives the user's responses and stores the user's responses in the database for later analysis.

Figure 4:
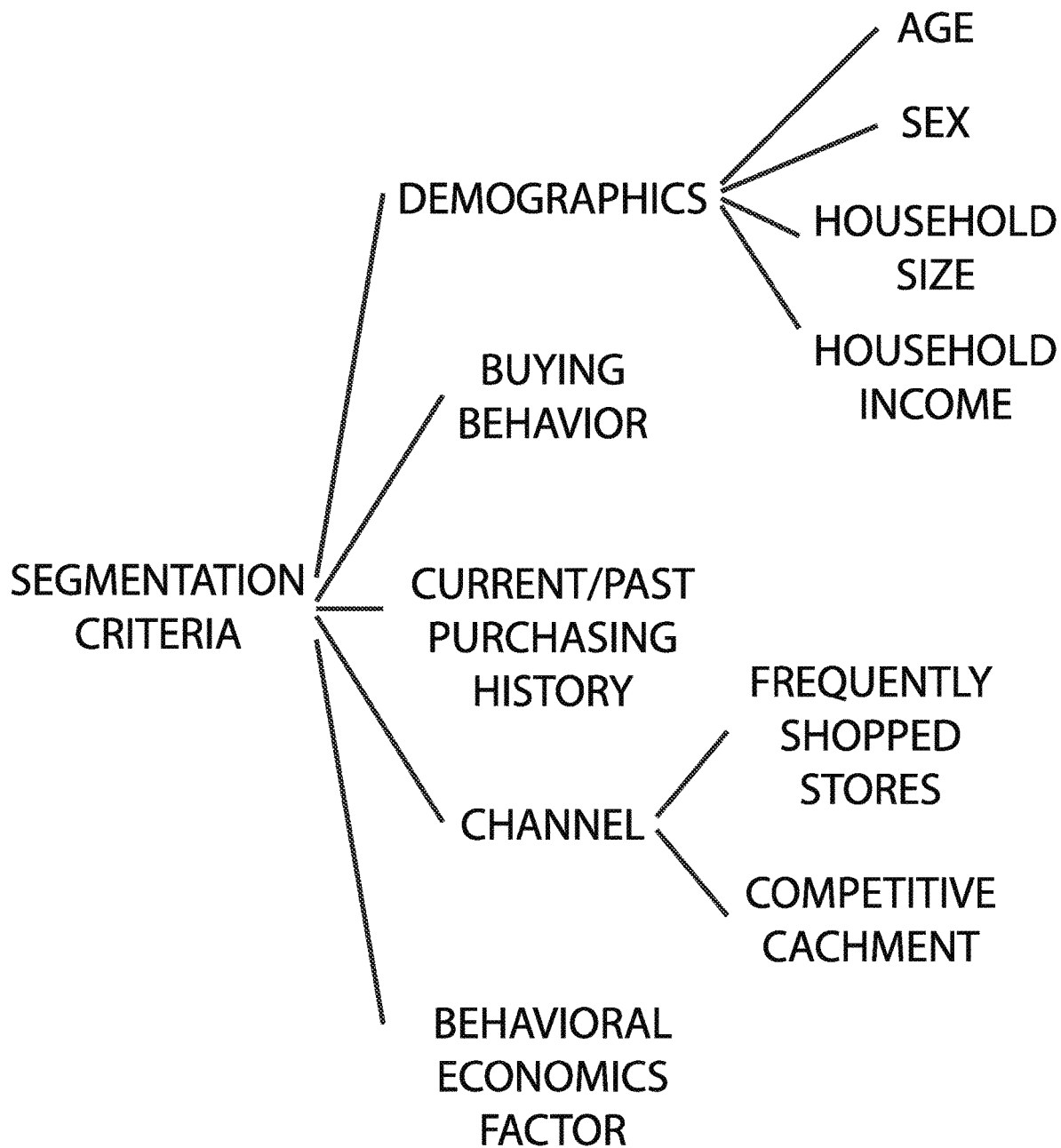
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
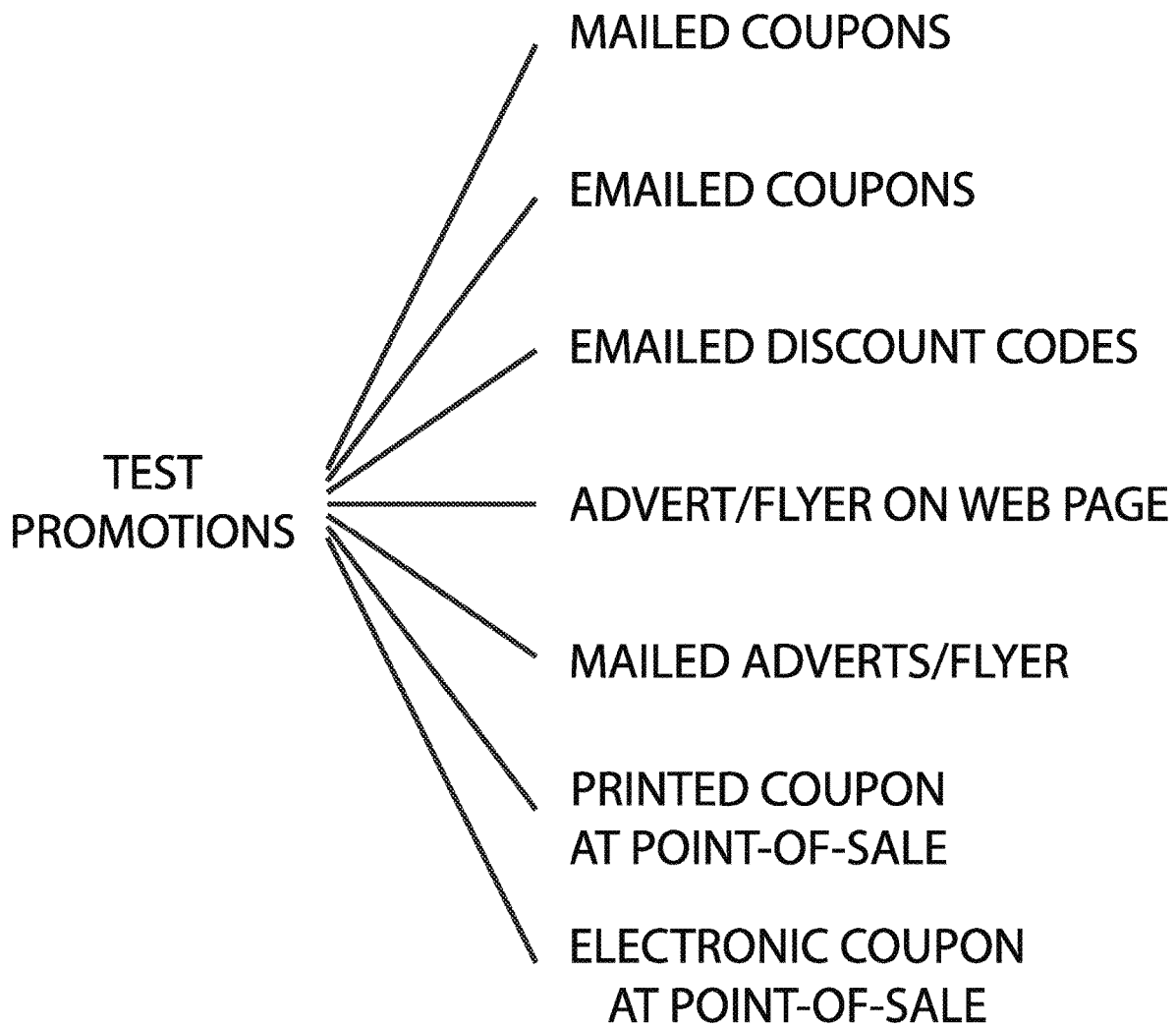
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet, and lastly display on an electronic pricing tag within a retailer's store. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale, or purchase of an item in a physical location that has the promotion displayed. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
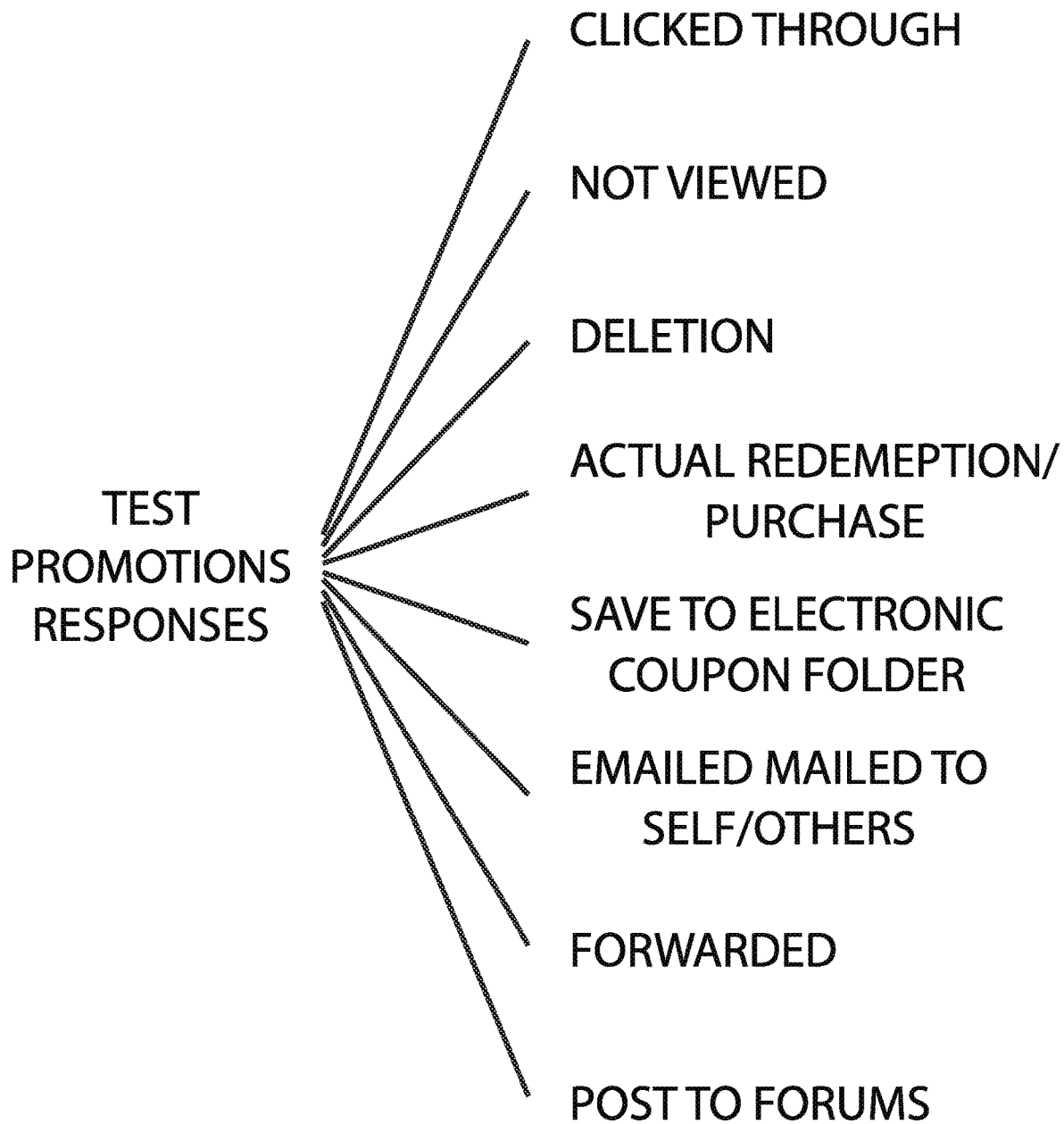
FIG. 6 shows, in accordance with some embodiments, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest), stopping to look at an item within the store (mild interest), and picking up the item in a physical store but ultimately not purchasing the item (strong interest). As mentioned, weights may be accorded to various consumer responses to allow the analysis engine to assign scores and provide user-interest data for use in formulating follow-up test promotions and/or in formulating the general public promotion. For example, low interest may be afforded a score of −0.75 to −0.25, mild interest could be afforded a score weight of 0.1-0.5, strong interest may be afforded a score of 0.5-0.8, and purchase of the product may be afforded a score of 1. The examples of FIG. 6 are meant to be illustrative and not meant to be exhaustive or limiting.

Figure 7:
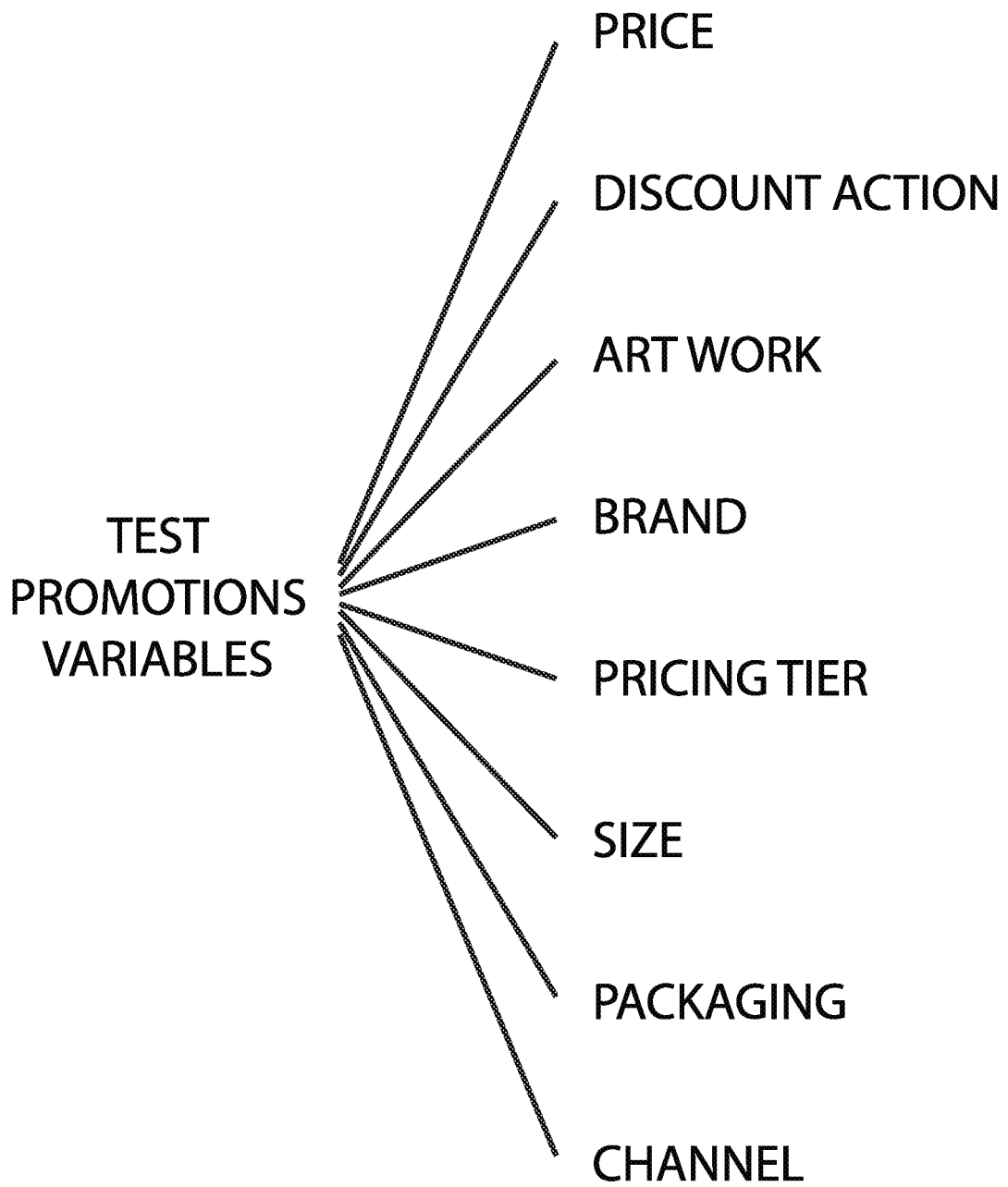
FIG. 7 shows, in accordance with some embodiments, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz., 16 oz., 8 oz.), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
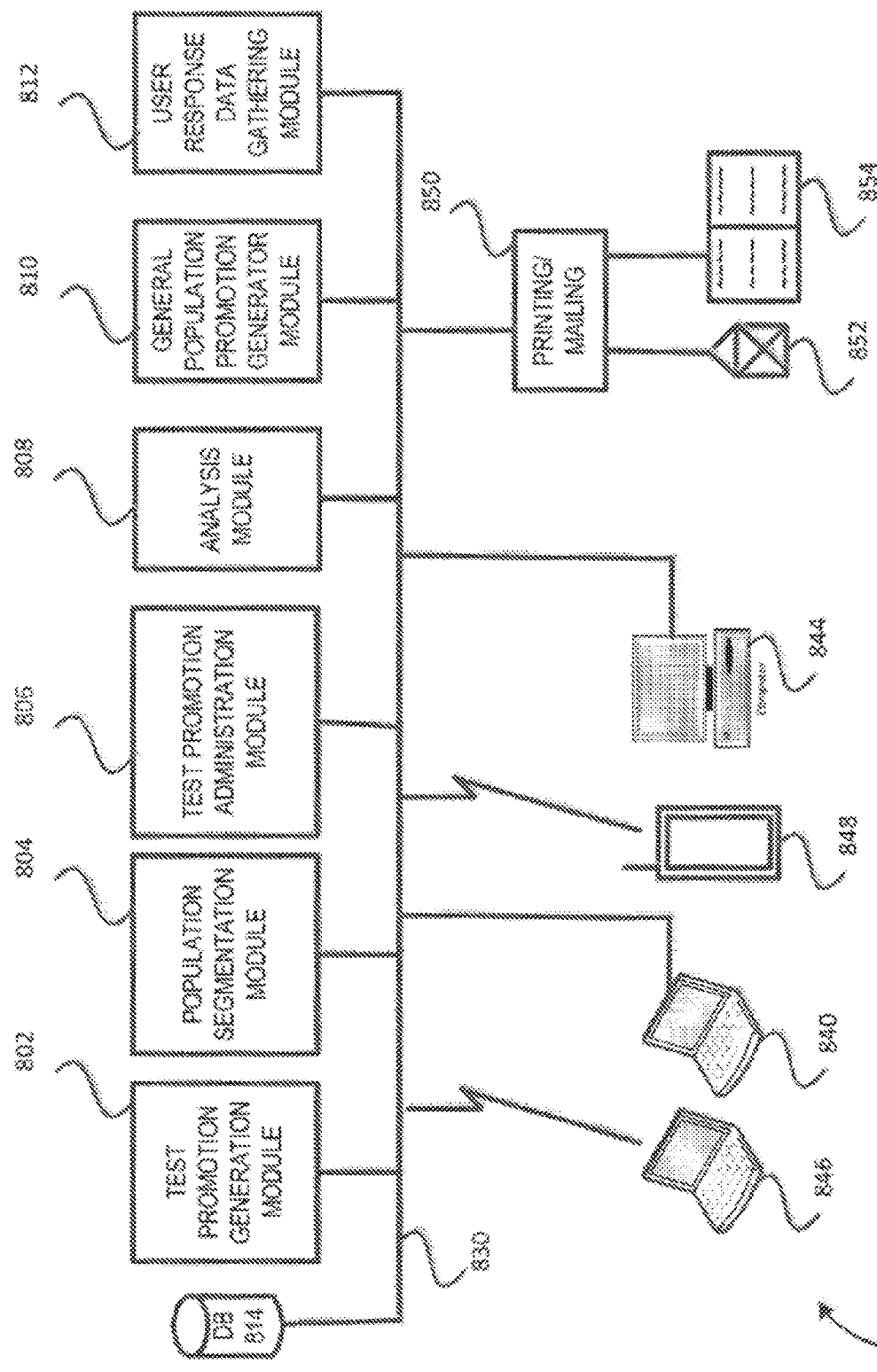
FIG. 8 shows, in accordance with some embodiments, a general hardware/network view of a forward-looking promotion optimization system.

FIG. 8 shows, in accordance with an embodiment of the invention, a general hardware/network view of the forward-looking promotion optimization system 800. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

As can be appreciated by those skilled in the art, providing a result-effective set of recommendations for a generalized public promotion is one of the more important tasks in test promotion optimization.

In one or more embodiments, there are provided adaptive experimentation and optimization processes for automated promotion testing. Testing is said to be automated when the test promotions are generated in the manner that is likely produce the desired response consistent with the goal of the generalized public promotion.

For example, if the goal is to maximize profit for the sale of a certain newly created brand of potato chips, embodiments of the invention optimally and adaptively, without using required human intervention, plan the test promotions, iterate through the test promotions to test the test promotion variables in the most optimal way, learn and validate such that the most result-effective set of test promotions can be derived, and provide such result-effective set of test promotions as recommendations for generalized public promotion to achieve the goal of maximizing profit for the sale of the newly created brand of potato chips.

The term "without required human intervention" does not denote zero human intervention. The term however denotes that the adaptive experimentation and optimization processes for automated promotion testing can be executed without human intervention if desired. However, embodiments of the invention do not exclude the optional participation of humans, especially experts, in various phases of the adaptive experimentation and optimization processes for automated promotion testing if such participation is desired at various points to inject human intelligence or experience or timing or judgment in the adaptive experimentation and optimization processes for automated promotion testing process. Further, the term does not exclude the optional nonessential ancillary human activities that can otherwise also be automated (such as issuing the "run" command to begin generating test promotions or issuing the "send" command to send recommendations obtained).

II. Offer Generation

As noted previously, offers may be presented by the retailer effectively as they have control over the retail space, and being furthest along in the supply chain, typically have more margin available to make meaningful discounts. Likewise, they can collect transaction logs for downstream analysis of the offer effectiveness. However, while retailers are excellent at selling goods, they typically lack the back-end infrastructure and expertise to properly generate, administer and analyze a comprehensive promotional campaign. And even though retailers have more margin available to implement discounts, it is often undesirable to bear the entire burden of a discount as this may significantly impact profitability.

Additionally, manufacturers themselves have a strong interest in having their specific products promoted (especially over their competitor's products). To this end, manufacturers often issue retailer independent manufacturer's coupons, or coordinate with retailers to generate personalized offers. Manufacturer's coupons are a blanket approach, costly to the manufacturer, difficult for the retailer or consumer to redeem, and of limited discount amount (as this cost is placed entirely upon the manufacturer).

Personalized offers, on the other hand, can be significantly more effective as they target consumers that are most likely to be swayed by the promotion. Additionally, as both the manufacturer and the retailer are sharing the cost associated with the promotion, the offer can either be more significant or the reduction in profit may be reduced for each party.

As previously addressed, such personalized offer campaigns may generally take one of two formats: personalized mailers, or personalized offers through a digital application of the retailer. Personalized mailers utilize third party consultants for the generation and presentation of offer structures to manufacturers. Generally these consultants operate on behalf of the retailer, extract a significant fee for their services, and "personalize" the offers by delivering the mailers to a particular zip code or by some other non-granular method (high cost low return). Mailers are also subject to fraud through the redemption of counterfeit coupon barcodes.

In contrast, a retailer application (such as Cartwheel by Target) allows for a greater degree of personalization of the offer, since each offer may directed to specific 'known' individuals based upon their buying habits. These applications are retailer specific, meaning that offers can only be made through that retailer, the retailer is responsible for determining which consumers to target with a given offer, a consumer needs to be aware of and use the retailer's application, and lastly the consumer can only redeem the offer at that given retailer.

This raises a number of problems, as noted, retailers are not well positioned to determine which consumers to target due to their limited data analytics expertise. Most (~80%) of the consumers at a given retailer do not use their promotional application. Over time it is expected that more consumers will engage with a retailer using these applications due to general consumer acceptance, however, ongoing technical glitches, lack of decent cellular service in many retailer buildings, and the fact that the consumer needs separate applications for each retailer, limits consumer adoption. Thus, while the number of consumers using these applications may increase over time, it is unlikely that even a simple majority of consumers will routinely employ a promotion application of a retailer. Lastly, a consumer doesn't want to travel to multiple retailers to get items at preferred pricing, so redemption of an offer at a wide range of retailers would be welcome by many consumers.

Figure 9:
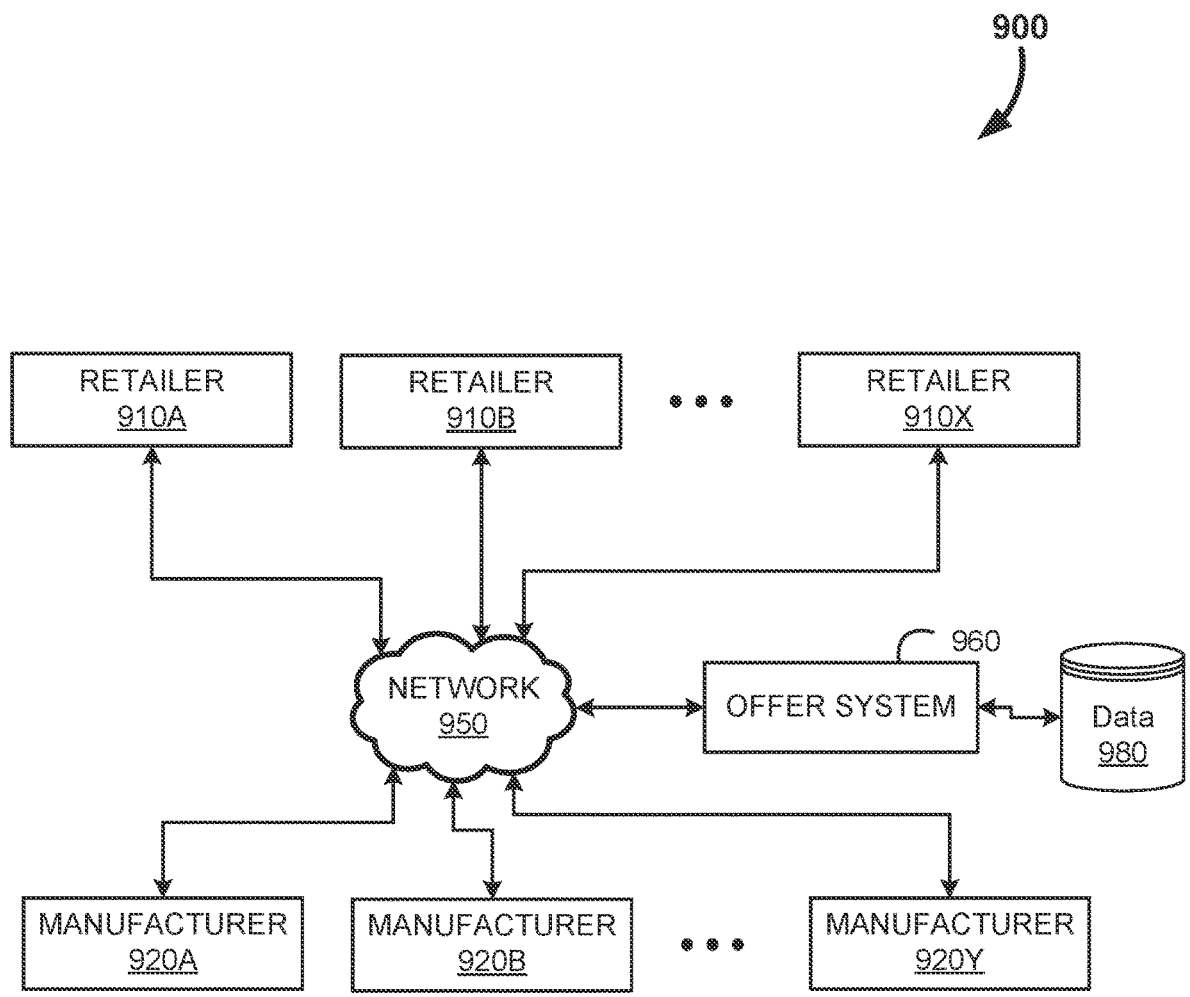
FIG. 9 shows, in accordance with some embodiments, a block diagram of an offer collaboration architecture.

In order to improve the prior methods of personalized offer creation, delivery and redemption, systems and methods of a collaborative offer portal and associated backend systems are provided, as well as system and method for a democratized offer redemption, which will be described in greater detail in the following section. To facilitate the discussion, FIG. 9 provides an example block diagram of an offer generation architecture 900. A plurality of retailers 910*a-x* may interact with a plurality of manufacturers 920*a-y* using an offer system 960 intermediary. This offer system 960 replaces the activities typically performed by a third party consultant, but delivers more refined and accurate results at a much lower cost than traditional methods. The offer system 960 may access one or more data stores 980, which may be populated with offer structures from the offer system 960, transaction logs from the retailers 910*a-x*, product details from the manufacturers 920*a-y* and additional third party data (such as trade group analytical data).

The various components of the offer generation architecture communicate with one another via a network 950. This network 950 may include the internet, cellular network(s), private or municipal local and wide area networks, or any combination thereof. In some particular embodiments, persons employed at the retailer and manufacturer may access the offer system on a web based application via the internet and a web browser. The offer system 960 received inputs from the manufacturer regarding scope and structure of a proposed offer campaign. The system can then generate analytics for the proposed offer and enable optimizations of both the offer structure and return on investment (ROI) of the offer. Once the manufacturer is satisfied with the offer proposition it may be presented to retailers in a marketplace that allows retailers to review and determine which offer campaigns would be desirable for their particular business. The system identifies the consumers to which the offer will be delivered, the exact costs, and the expected returns. The offers may then be delivered by mailers, email messages, loyalty application programs, text messages, etc. The entire service is statistically driven and automated, allowing for highly targeted and efficient administration.

Figure 10:
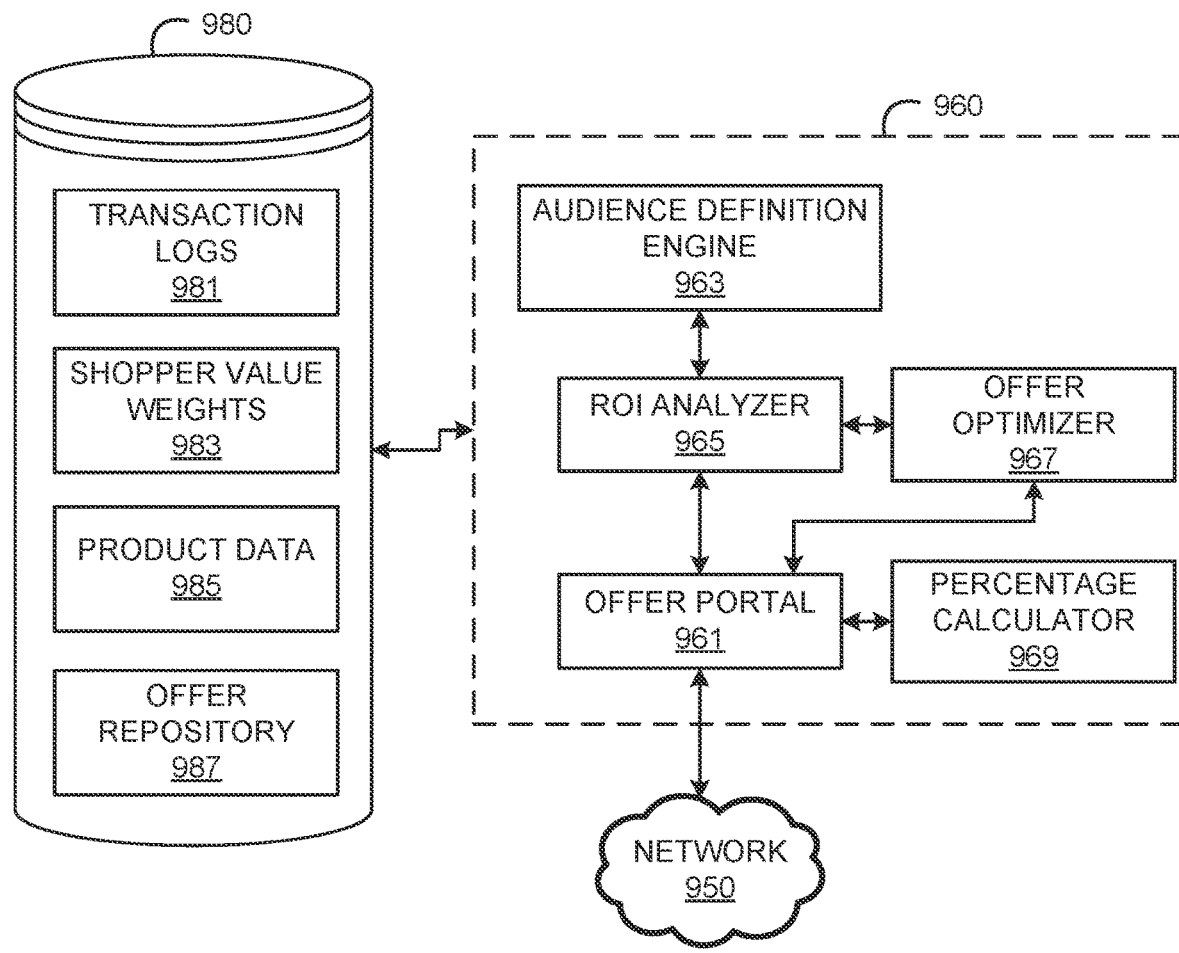
FIG. 10 shows, in accordance with some embodiments, an example illustration of an offer system.

The offer system 960 is presented in greater detail at FIG. 10. As noted, the data store(s) 980 includes, at a minimum, transaction logs 981 collected from one or more retailers, shopper weight values 983, product data 985 from the manufacturers, and a repository of prior offers 987. The offer repository 987 allows manufacturers to rapidly select offers for deployment rather than generating entirely new offer structures. Analytics may be stored along with the offer for a given population base, and if already deployed previously, the actual response results. This saves significant computational resources, which improves the server's operation by delivering meaningful results with minimal additional computational load.

The shopper weight values 983 in contrast are retailer specific values that are set by each retailer to assist in prioritizing the consumer segments that are to be targeted, and determining the value of any given offer as it pertains to that retailer. These values are provided by each retailer to the data store 980, and are leveraged by the offer system 960 for the ROI calculation. Thus, even for a given offer proposition by a manufacturer, the value and the degree of cost sharing will differ by each retailer by the consumers associated with the retailer, and also the retailer's priorities. The data store 980 may also include data collected from third party data sources (not illustrated) such as social media data feeds, governmental data sources, public databases and subscription data feeds (e.g., Nielsen, industry associations, etc.).

The offer system itself 960 includes an audience definition engine 963 that determines the consumers at play for a given retailer using loyalty card information, credit card data, pharmacy identifiers, and third party data (social media data, public records, etc.). For the defined consumer audience, the ROI for a given offer structure is determined using an ROI analyzer 965. The ROI analyzer utilized transaction logs and data known for each of the consumers, along with the shopper weights 983 from the retailers, to calculate a "value" for each consumer. The consumers are then aggregated into buckets of a defined size by this value. Thus, for any given promotion with a particular number of offers being issued, the total value of the offer campaign may be determined based upon the value of the consumers that receive the offer.

The offer scope and structure are received from the manufacturer via a web based offer portal 961, in some embodiments. The ROI results are then presented to the manufacturer via the same interface. A percentage calculator 969 determines, based upon the value to the retailer, a percentage of cost that each party would be responsible for, which is likewise displayed upon the offer portal 961. The percentage calculation may be a linear equation correlating percentages to the calculated ROI value of the offer campaign, or may correlate using some other criteria (e.g., logarithmic, inverse, etc.).

Also provided via the offer portal is an offer optimizer 967 which can provide optimizations for both the offer scope/size, and for the offer structure. Offer structure optimization may include using results from prior offer experimentations, as discussed in considerable detail previously, to select "winning" variable value combination to improve the offer effectiveness. Generally the offer optimization will maintain the product type static, and marginally adjust the total discount level, and enable greater differences in offer structural components. This is because the manufacturer, when setting up the proposed offer, have a very clear idea of which product they wish to promote. As such this variable is artificially maintained consistent. The manufacturer also has a degree of discount that they desire to offer the product at. This degree of discount may be marginally varied (by plus or minus ten percent in some embodiments), but significant deviation from the discount amount can cause frustration or annoyance to some manufacturers. However, once a manufacturer has successfully leveraged the proposed systems and methods repeatedly, this discount amount deviation may be increased (to plus or minus 25% for example) as the manufacturer gains confidence in the system's operation and value proposition. In yet other embodiments, the manufacturer may set a threshold of how much the discount amount may be modified via an offer structure optimization.

The offer type, graphic, and other possible variables, may likewise be optimized for. Unlike the product and discount amount, these variables are often less constrained, and the optimization may pair winning variables values even if they differ significantly from the originally proposed offer. For example, a manufacturer may initially propose "25% off the regular price of $3.99". The discount amount is one dollar in this offer. The system may determine, based upon the prior discussed experimentation, that for this product a promotion of "2 for $6" is more effective, even though the discount amount is equivalent. The manufacturer is not generally concerned if the offer is a "buy X for Y" percentage off, advertised discount price, etc. Rather, the manufacturer is concerned with the depth of discount and margin of the sale. Thus, the system is granted significant latitude in altering these types of variables in the pursuit of an optimal offer structure.

The offer size optimization, on the other hand, determines the size of the optimization that balances the goals of the retailer and manufacturer, with the expected return. As noted, the system groups customers by their calculated value. An offer campaign that is sent out to ten thousand consumers can thus be targeted to the ten thousand most valuable customers, yielding a greater return than if it were to target less valuable customers. Thus, by definition, as the size of the offer campaign increases, the less and less valuable customers need to be targeted. This generates an incentive to have limited smaller offer campaigns, but when the campaign is too small, it can result in negligible lift in sales, and less impact. Thus, for any given offer campaign there is an optimal size that reaches enough consumers to be effective, but still manages to largely target only consumers that are deemed "valuable". This optimal size, is dependent upon the value distribution of customers. For example, if a retailer has thirty thousand customers that are rated highly, and there is a significant drop-off in consumer value after this cohort, the optimal size may be limited to these thirty thousand consumers. In contrast however, if the retailer has only five thousand very high value consumers, and then a gradual decline of value over the next fifty thousand customers, and then a sharper decline thereafter, the optimal offer campaign could be limited to an average of the consumer values above a configured threshold. Depending upon the degree of value decline after the initial five thousand consumers and the configured average value threshold, for this example the offer size could vary from perhaps ten thousand offers to fifty five thousand customers.

In some embodiments, the offer system may include a plurality of virtual systems operating for each retailer. In these embodiments, the manufacturer(s) access the offer system for a given retailer which defines the consumer audience by the consumers specific to that particular retailer. The ROI values, offer optimizations and percentage calculations would likewise be calculated specifically for the given retailer. In alternate embodiments, the offer system may be genericized for multiple retailers, and audiences are defined for each applicable retailer, and associated analytics and discount percentages are generated for each retailer as well. An 'average' set of data may be presented to the manufacturer for assisting in the offer generation in these embodiments, which can then be tailored to each interested retailer in subsequent stages.

Figure 11:
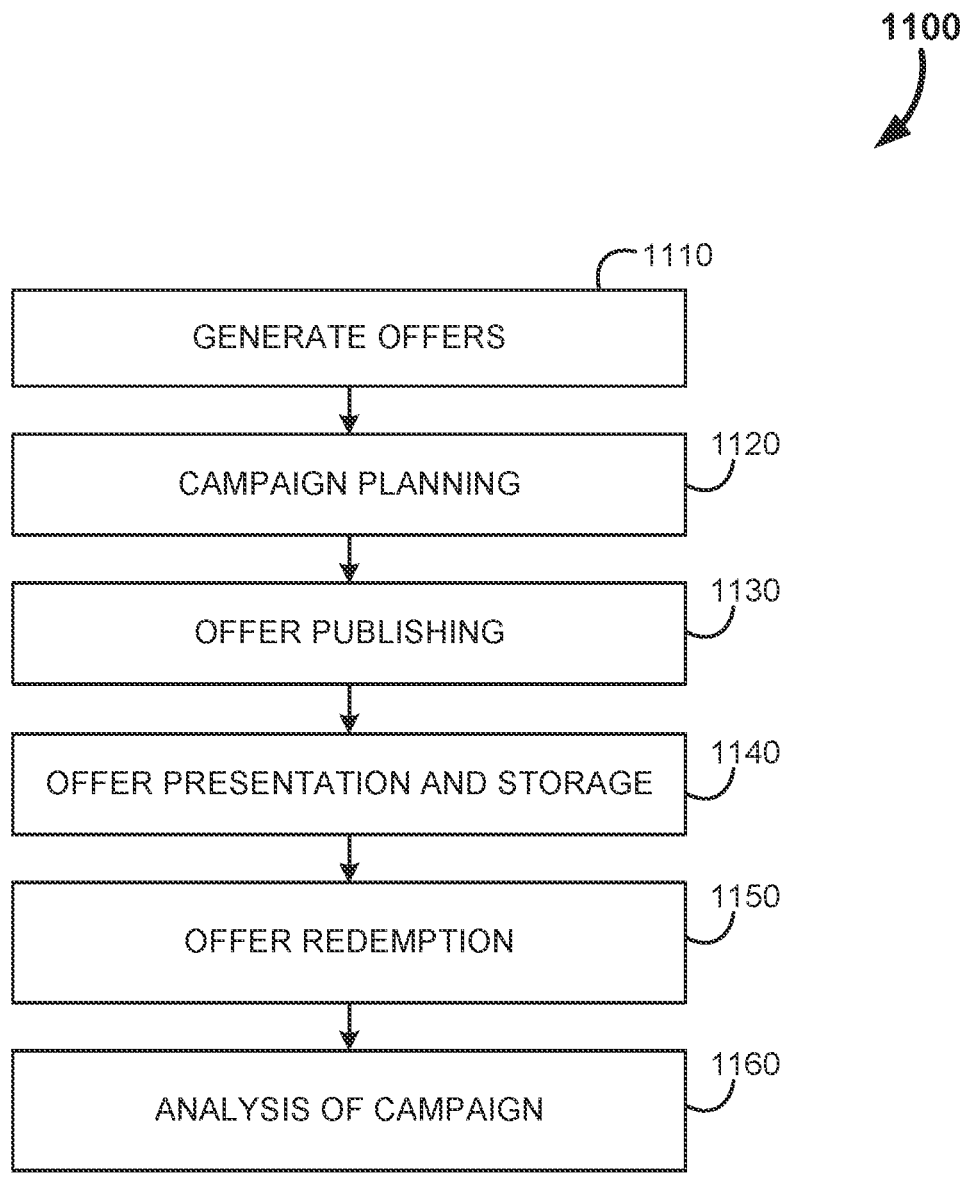
FIG. 11 shows, in accordance with some embodiments, a flowchart of an example method for the administration of an offer.
Figure 16:
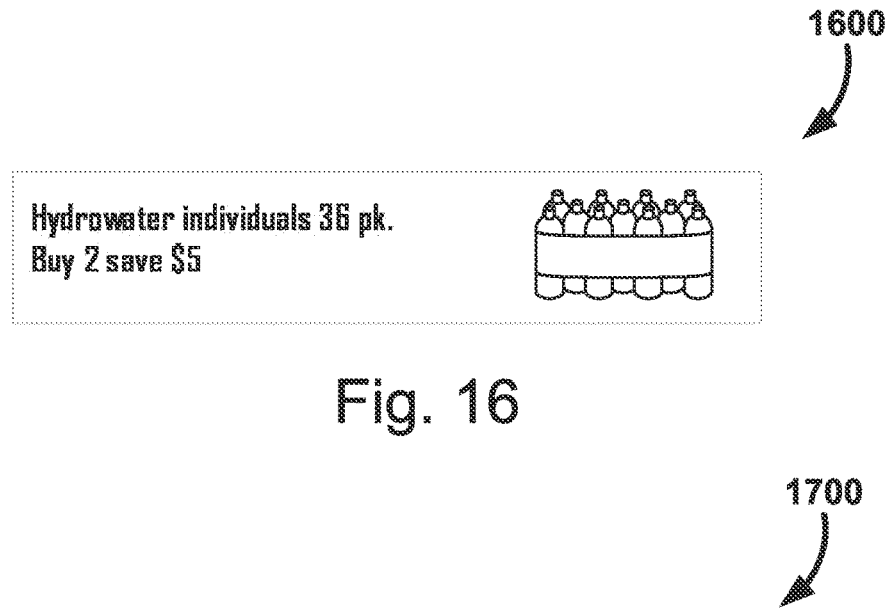
FIG. 16 shows, in accordance with some embodiments, an example screenshot of an example offer.

Turning now to FIG. 11, the process for offer administration is provided generally at 1100. This process initially starts with offer generation (at 1110) which is described in greater detail in reference to FIG. 12. In this sub process the manufacturer accesses the offer portal (at 1210) where they generate a proposed product offer (at 1220). FIG. 16 provides an example screenshot image of such a product offering, shown generally at 1600. The system takes the proposed offer and generates the ROI value distribution for the consumer base (at 1230). FIG. 13 provides greater detail regarding this RIO calculation. Initially weights for shopper headroom, product headroom and product importance are received from the retailer (at 1310). Shopper headroom is defined as whether the shopper already purchases the type of product for which the offer is being generated, and if not, if this is the kind of person that might possibly purchase this kind of product in response to an offer. Shopper headroom can also be generalized to a determination of how much additional spend the shopper is capable of likely to spend if properly motivated. Product headroom, similarly, is the additional amount of cost that the particular shopper may be willing to spend on the particular product. Product importance is a determination of how valuable the particular product is to retaining a given shopper. For example, for most grocers, eggs and milk are considered anchor products. Retailers take great pains to keep the prices of these products low because they are believed to keep customers coming back regularly. Product importance can be determined for a given shopper based upon the frequency it is purchased and degree of loyalty to the retailer and brand the shopper exhibits.

The values for the shopper headroom, product headroom and product importance are then calculated for a given shopper (at 1320). Transaction logs from the retailer are utilized in this determination. For shopper headroom, a shopper who already purchases the product may be given a high shopper headroom score. A consumer that has not purchased the product before may be given a lower score based upon a propensity model that is generated for the individual. The propensity model utilizes machine learning to group together consumers by purchasing behaviors, and the percentage of consumers in the group that purchase the product is set as the consumer's propensity for purchasing the product. The grouping may leverage deep learning neural networks, or known clustering algorithms, such as least mean square.

Instead of grouping consumers, alternate embodiments may generate the propensity model for the consumer by identifying one or more factors that indicate the consumer is likely to purchase the item. This includes looking at products purchased historically by the shopper in a product similarity matrix (closer degree of past product purchase to the given product signifies a greater purchase propensity), and modeling features such as frequency, recency, past purchases, and customer segmentation features to a propensity value using neural network abstractions based upon training data from other consumers. Additionally, collaborative filtering with the retailer may be employed in determining the propensity model for a given consumer.

Calculation of product headroom includes calculating price elasticity for the product in question for the particular consumer to the degree that sufficient transaction logs are present. More frequently however, the consumer is grouped with similar consumers based upon prior purchasing behaviors (again, clustering algorithms and/or machine learning may be employed in the grouping of consumers). The price elasticity measures for this consumer segment are then determined from the transaction logs, and may be used as the product headroom for the particular shopper in lieu of the elasticity for the particular shopper for the product.

Product importance is calculated by the frequency/degree of regularity that the given shopper purchases the given product. This may be calculated as a percentage of the shopping trips the consumer purchases the given good. Product importance may additionally be calculated based upon how important the product is to keeping the shoppers loyalty to the retailer. If the shopper is a high volume shopper of this product that historically is a low volume product, for example, would be an indicator of retailer loyalty. Similarly, product brand loyalty may contribute to the determination of the product's importance. For example, a consumer that purchases exclusively Diet Coke would indicate a high degree of brand loyalty. A consumer that purchases Coke Zero Sugar as well would have lower brand loyalty. Further, a consumer that purchases Diet Pepsi and house branded diet cola would indicate a low degree of brand loyalty.

Additionally, the overall shopper value is calculated. This calculation is significantly more straight forward that the other calculations, and is based upon the size and frequency of all purchases performed by the consumer. The number of individuals in the household may also be determined and impact the overall shopper value. In yet other embodiments, the life stage of the members of the household may be determined and impact their shopper value. For example, a young couple with an infant may be a relatively low value shopper, but the expectation that their expenses will be increasing significantly with a growing family, and as they enter prime earning years may be utilized to adjust their value upwards speculatively. In contrast, if the household has been tracked for a significant period of time, and it is determined that members are nearing adulthood (and are likely to leave the household for college or a career) then what may be a generally high valued shopper household may be speculatively adjusted downward accordingly.

Loyalty card information, pharmacy identification, and credit card information may all be linked together to identify discrete consumer "households" for the purposes of all of these calculations. In the content of this application, a shopper, consumer, customer and household are all utilized interchangeable, and are indicative of a purchasing entity. This may include a single individual, but more often includes groupings of people that either cohabit with one another, or belong to a common organization; for example a church group or coworkers could be considered a "household" for the purposes of data analysis in some embodiments.

The calculated shopper headroom, product headroom and product importance are all then multiplied by the weights supplied initially by the retailer to reflect the retailer's priorities (at 1330). The resulting values may then be combined together by normalized summation or by multiplication to generate an overall ROI value for the given consumer. This ROI value may, in some cases, be further modified by the shopper value that was calculated, and/or a product segment importance set by the retailer. This modification may include weighting the ROI value for the product and shopper by these values.

Figure 17:
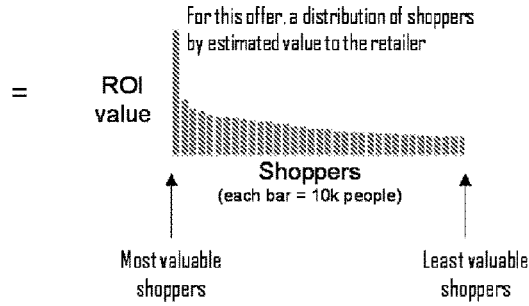
FIG. 17 shows, in accordance with some embodiments, an example of the calculation of a return on investment distribution.

Once the ROI value has been determined for each shopper, they may be collected into equally sized buckets to generate a value distribution (at 1340). FIG. 17 provides an example illustration of the ROI distribution calculation, shown generally at 1700.

Figure 14:
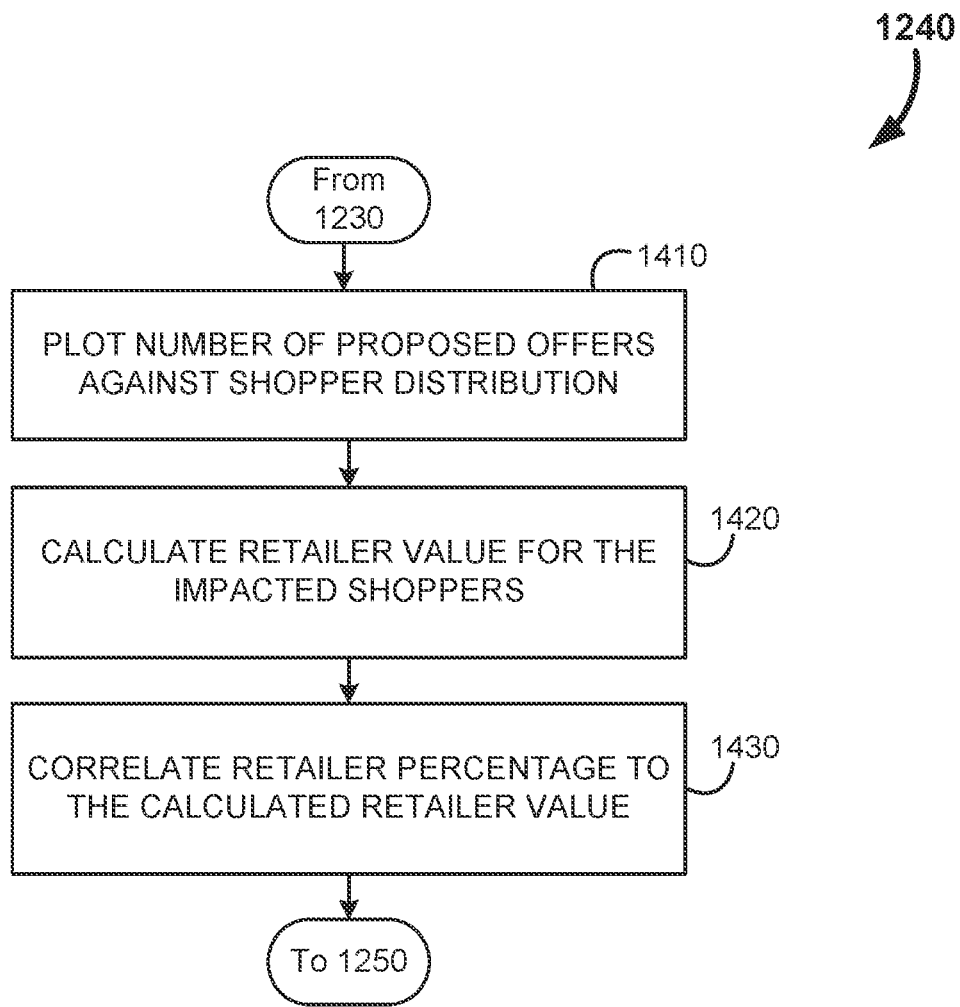
FIG. 14 shows, in accordance with some embodiments, a flowchart of an example method for the determination of a percentage split of expected offer payment between a retailer and a manufacturer.
Figure 19B:
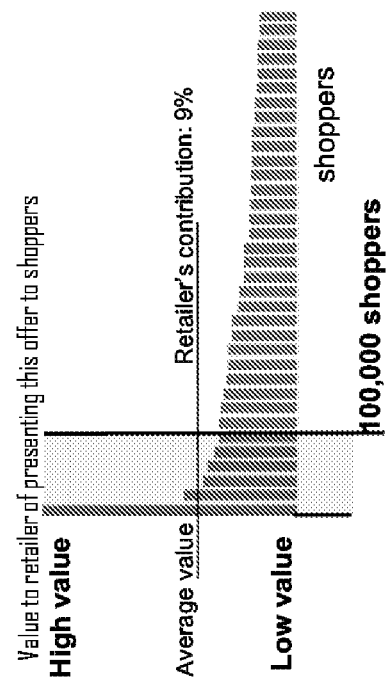
FIGS. 19A and 19B show, in accordance with some embodiments, diagrams of how the discount percentage is calculated.
Figure 19A:
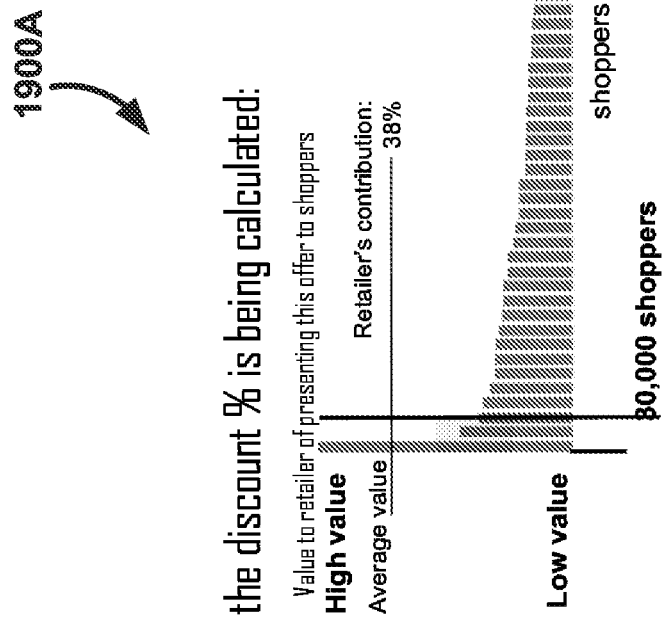

Returning to FIG. 12, after the ROI distribution has been generated for the shoppers at the retailer for the given product, the discount percentages that are paid by the retailer and manufacturer are calculated (at 1240). FIG. 14 provides a more detailed diagram of this process. The number of offers being considered as part of the campaign are initially plotted against the shopper distribution (at 1410) that was previously calculated. The value of for the retailer is thus calculated (at 1420) based upon the average value, per offer. This is the area under the curve over the distribution curve from zero to the number of offers in the promotion campaign, divided by the total number of offers issued. For a retailer with a large number of high ROI valued consumers versus the number of offers being considered in the campaign, this value will be larger. The retailer value is then correlated (generally linearly, logarithmically or exponentially) to a percentage of the offer cost that the retailer is expected to pay versus the manufacturer (at 1430). FIGS. 19A and 19B illustrate this percentage determination for a given shopper distribution. In FIG. 19A, an offer campaign in proposed for 30,000 offers. The distribution indicates that the retailer has 10,000 shoppers with a high ROI value for this product, but the subsequent 10,000 shoppers have an ROI value that is roughly half that of the first segment of consumers. Values decrease modestly for each subsequent grouping of consumers. For the first 30,000 consumers that have the highest ROI value, the average value is determined to be relatively high, as seen at 1900a. In contrast, at FIG. 19B, when the offer campaign is extended out to the top 100,000 consumers the ROI value per offer is nearly 30% lower than the more limited offer proposal. The shape of a distribution of shoppers, and total number of offers considered are dispositive in determining the average ROI value for the retailer.

Figure 15:
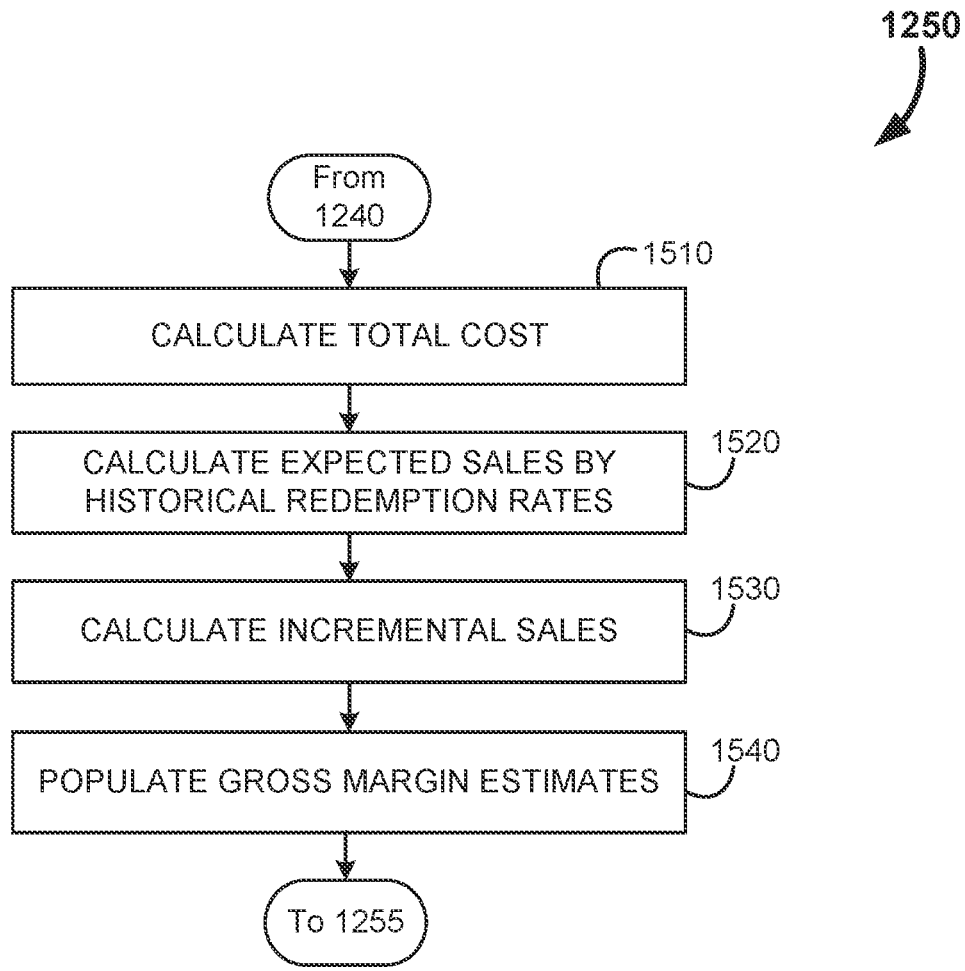
FIG. 15 shows, in accordance with some embodiments, a flowchart of an example method for the determination of discount percentages.

Returning to FIG. 12, after discount percentages are calculated for the proposed offer, the offer predictions may be calculated (at 1250). FIG. 15 details the process for these prediction calculations, which include calculating the total cost, for both retailer and manufacturer, for the offer campaign (at 1510). This cost calculation is a summation of the promotion discount plus times the number of offers being considered, plus the administrative cost for the offer, multiplied by the share attributed to the retailer and the manufacturer, respectively. For example, a discount of a dollar over ten thousand offers will cost $10,000. An email distribution will be less than a mailer. Administrative costs will often benefit from economies of scale, so the per offer cost will go down as the total number of offers increases. For this example, however, assume the administrative costs are $2,000. Likewise assume the retailer is responsible for one third the cost, and the manufacturer the remaining two thirds. Thus the retailer cost is calculated as $4,000, and the manufacturer $8,000 in this example.

Figure 18:
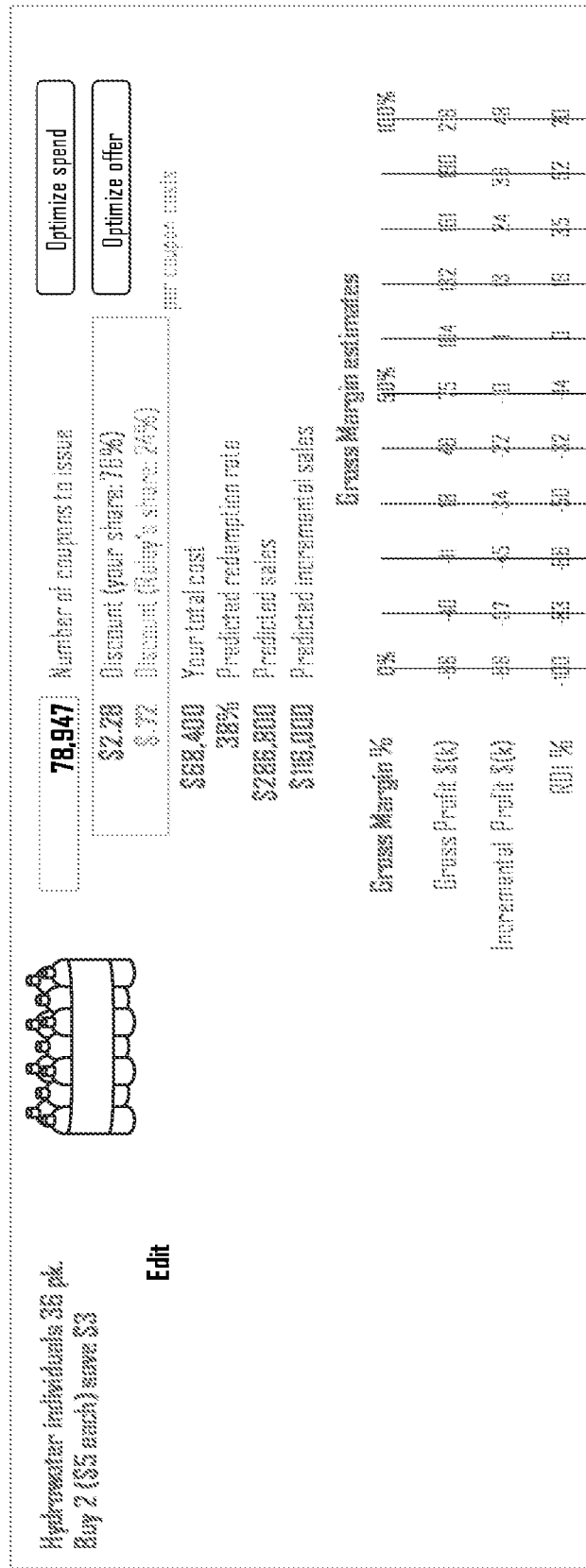
FIG. 18 shows, in accordance with some embodiments, an example screenshot of an offer analytics dashboard.

While costs are calculated with assurance, the system additionally generated a number of predicted values, including the expected sales (at 1520) determined from previous transactions as discussed in significant detail in the prior section. Incremental sales are likewise calculated (at 1530) by referencing test results and past sales data, and gross margin estimates are populated (at 1540). Calculating gross margin for the manufacturer requires the manufacturer's per-unit margin details, which may be unknown to the retailer, therefore a table can be provided showing all possible margin percentages. FIG. 18 provides an example screenshot of a dashboard 1800 showing the offer details, costs predicted sales, predicted incremental sales and gross margin estimates. The manufacturer has the option of editing the offer manually, or performing an offer structure optimization or an offer size optimization (spend optimization).

Figure 12:
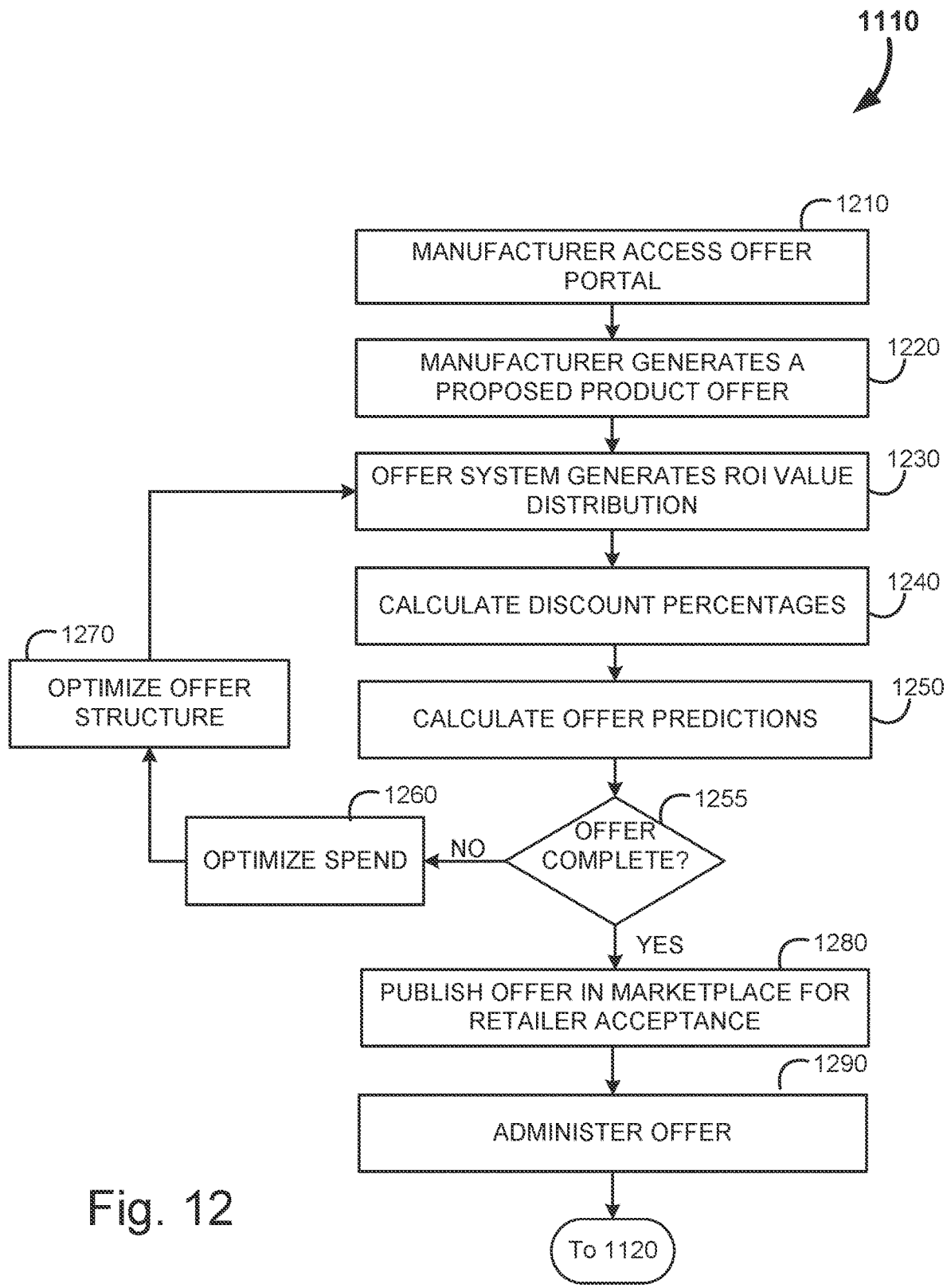
FIG. 12 shows, in accordance with some embodiments, a flowchart of an example method for the offer generation.
Figure 13:
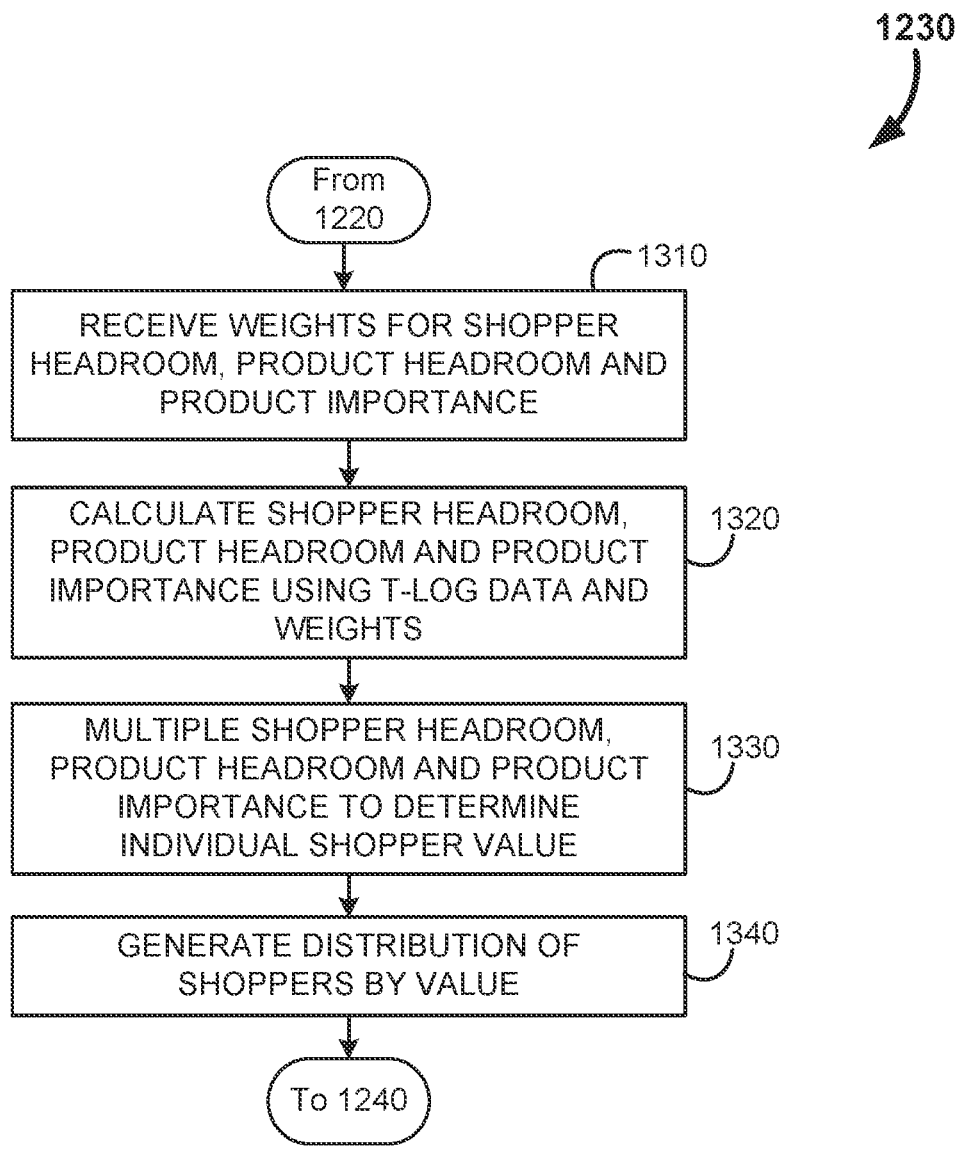
FIG. 13 shows, in accordance with some embodiments, a flowchart of an example method for the determination of a return on investment distribution.

Returning for FIG. 12, after the prediction have all been made, the manufacturer determines if the offer is complete (at 1255). If not, the spend may be optimized (at 1260) and/or the offer structure may be optimized (at 1270) in the manners described previously. Transaction logs and promotion experimentation results can be used to modify the offer variables when offer structure is optimized. Again, the product is left unchanged, and discount levels are generally maintained, but other offer variables may be altered to make the offer more effective. The spend optimization is dependent upon the predicted ROI value distribution, and ensures that the value to the retailer is sufficiently met. High spend correlates to pushing the offer to a broader, less-targeted audience and therefore devalues the offer to the retailer, by devaluing the offers pushed to the retailer's customers. By balancing the targeting-precision of the offers with the percentage of the costs covered by the manufacturer, the system encourages manufacturers to target their spend to the advantage of the retailer. Highly targeted promotions, limited to the shoppers most interested, require the lowest percentage of manufacturer funding while the least-targeted promotions require the highest percentage of manufacturer funding This process repeats until the offer is completed, at which stage the offer is published in a marketplace for acceptance by the retailer (at 1280). Once accepted the offer is administered (at 1290). Returning to FIG. 11, the campaign is planned (at 1120) including the vehicle of offer presentation, timing, length of offer etc. The offer is then published accordingly (at 1130) to the identified most highly ROI valued consumers via mailer, email, SMS message, or other personalized transmission. The offer is presented and stored by the consumers (at 1140), and eventually redeemed (at 1150). The system may then perform analysis (at 1160) of the offer results, including the collection and updating of transactions logs. The offer repository data may be appended with information regarding the offer effectiveness as well for future reference.

III. Offer Redemption

Figure 20:
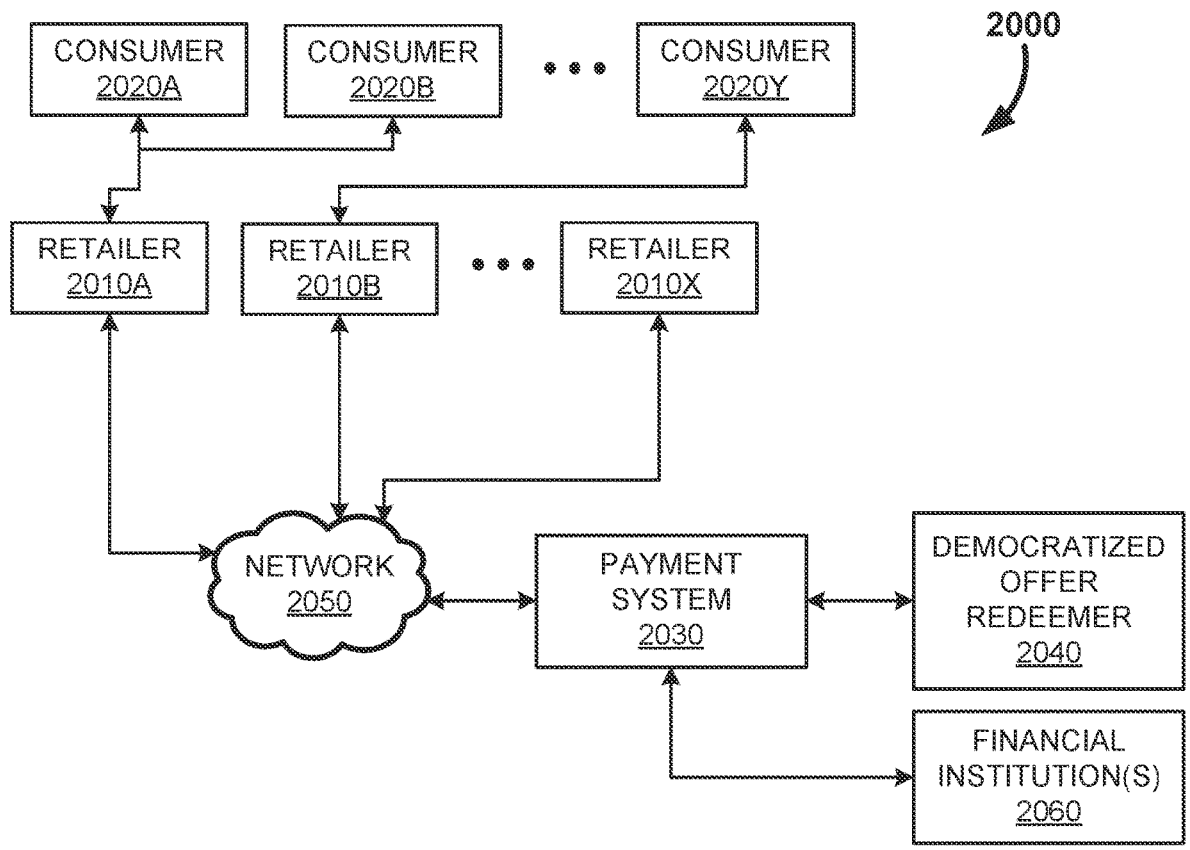
FIG. 20 shows, in accordance with some embodiments, an example block diagram of an offer redemption architecture.

Moving on, FIG. 20 illustrates a block diagram of an example architecture for the redemption of offers in a manner that is not tethered to any particular retailer, shown generally at 2000. It should be noted that this offer redemption system may be employed with any offer generation and administration frontend. While particularly powerful systems and methods for the generation of offers has been described in the previous section, even offers generated by traditional third party consultants could benefit from the offer redemption methodologies described herein. Likewise, while this system and method for offer redemption has distinct benefits compared to prior offer redemption techniques, the above described offer generation may likewise be employed using only traditional offer redemption technologies. Of course the combination of these techniques provides a full optimized offer lifecycle system that is unmatched by prior technologies, however the combination is not necessary and shall not limit the scopes of the present inventions.

In the offer redemption system the retailers 2010*a-x* are visited by consumers 2020*a-y*. At the retailer they purchase items for which there are active offers. Payment at the retailers is made at a point of sale (POS) terminal, which connects via the internet, telephone lines or secure network 2050 to a payment processor 2030. The payment processor 2030 may be third party entities that manage the payments between the merchant/retailer 2010*a-x* and the financial institutions 2060. Financial institutions 2060 may include banks, credit card companies and the like.

Traditional offer redemption by manufacturer coupon could be redeemed at a number of retailers, but involves physical coupons that are a hassle for consumers and retailers alike. Additionally, these coupons are subject to a significant fraud risk, as previously discussed. In contrast, loyalty applications and loyalty cards are retailer specific, so while redemption is easier at the given retailer, it requires the consumer to use the retailer loyalty application (which as discussed few consumers actually do), and requires a different offer application for each retailer. If a consumer shops at Walmart, Target, Safeway, King Soopers, and two local grocery chains this would require the consumer to download and manage six separate loyalty applications. For many people, even those that are comfortable using loyalty applications, this is demanding, and may discourage shopping a less frequented retailers or avoidance of the applications.

The present systems and methods improve upon these systems by enabling offer redemption at any participating retailer (like manufacturers' coupons), without the need for physical coupons and the attendant hassle and fraud potential. This is accomplished by allowing for an offer application that is retailer agnostic and that leverages a democratized offer redemption system 2040 which operates with the payment systems 2030 to allow offer redemption.

Figure 21:
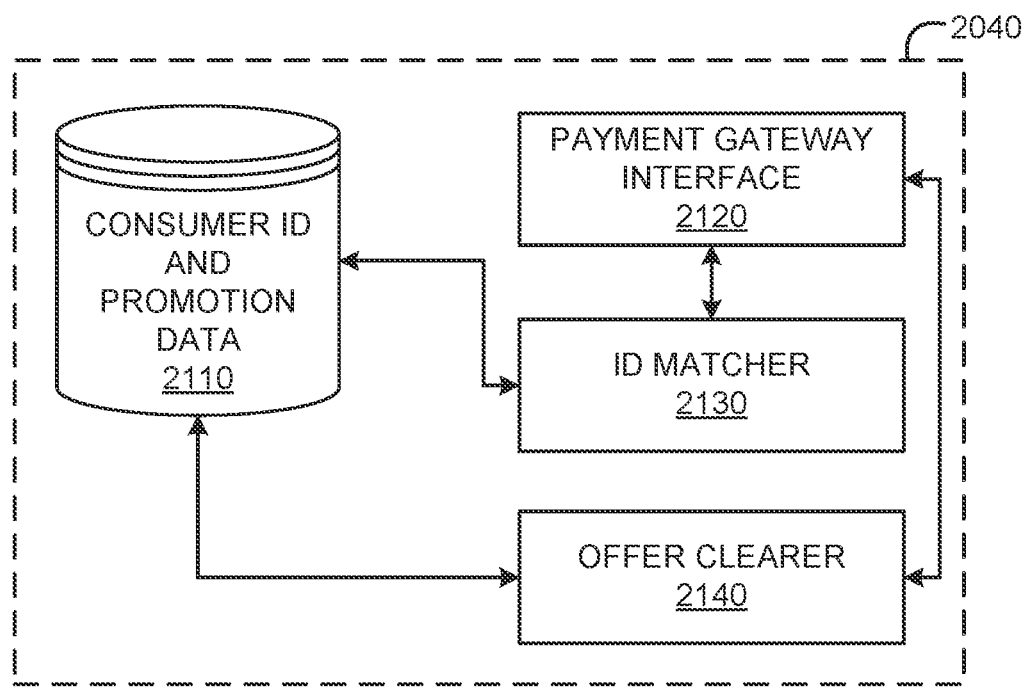
FIG. 21 shows, in accordance with some embodiments, an example block diagram of a democratized offer redeemer.

FIG. 21 provides a more detailed view of the democratized offer redemption system 2040. Core to the system is the ability to collect data from the retailers regarding loyalty card information, pharmacy identification and credit card information. In the manner disclosed previously, this data can be cross referenced to correlate particular payment methods (credit card and debit card numbers) to household identification. The consumer ID is then linked to promotional offers being provided to that household in a dataset 2110. When a payment transaction is received via the payment gateway interface 2120, the payment data may be compared against the known households by an ID matcher 2130. When a suitable match is determined, applicable offers are communicated back to the retailer so that the payment total is reflective of the offer, and subsequently an offer clearer 2140 is able to purge the promotion from the system to ensure that the offer is not duplicated.

Figure 22:
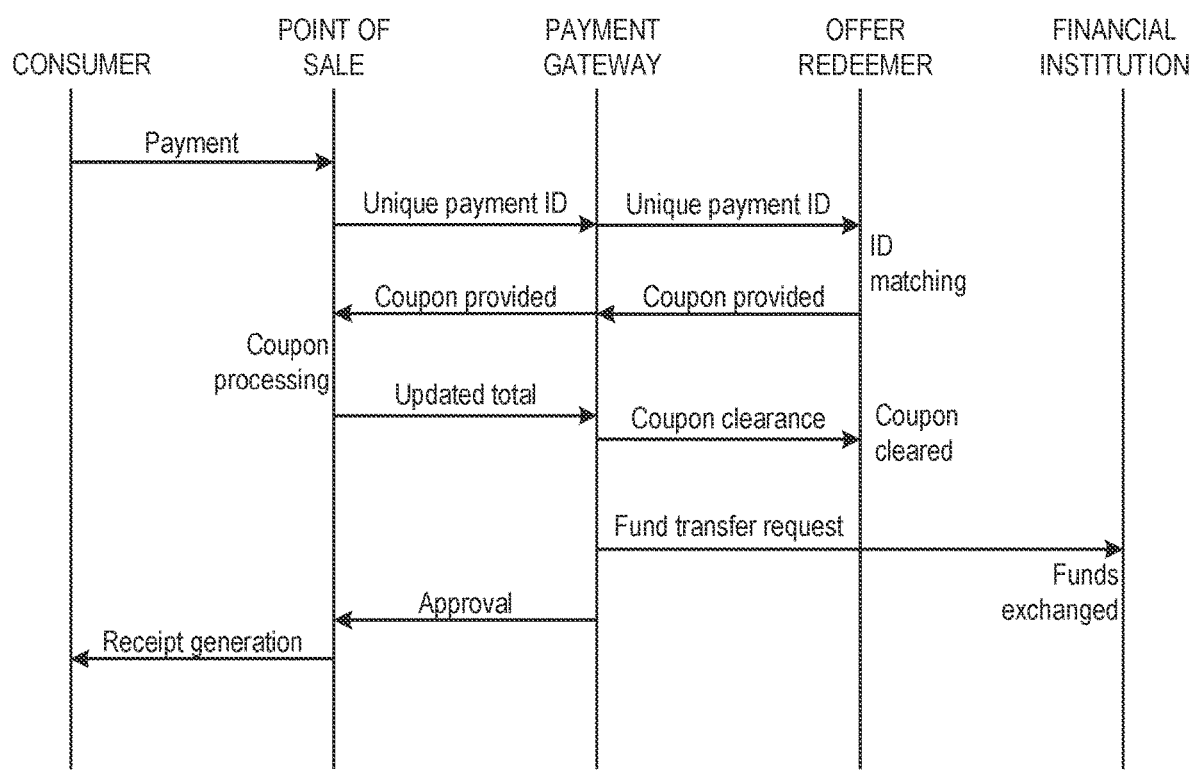
FIG. 22 shows, in accordance with some embodiments, an illustration of communication between the entities involved in an offer redemption.

Due to the number of entities interacting in this process, a diagram is provided at FIG. 22 that illustrates the communication between the respective systems, shown generally at 2200. The consumer selects products at the retailer (or online where applicable) and at the retailer point of sale engages in payment of the products. The payment data is collected at the POS and transferred to the payment gateway, which communicates it to the offer redemption system. The system matches the payment identification to an ID, and provides back the offer details to the payment gateway, which in turn supplies the details back to the POS terminal.

The offer is processed at the POS terminal to update the price. The updated total is provided to the payment gateway, which performs two actions. Firstly, the offer redemption system is notified of the offer being successfully applied, at which point the offer is cleared to prevent repeated use. Secondly, the payment system initiates the fund transfer with the appropriate financial institution.

An approval of the funds transfer is provided back from the payment gateway to the POS terminal, which generates a receipt reflecting the offer to the consumer.

Figure 23:
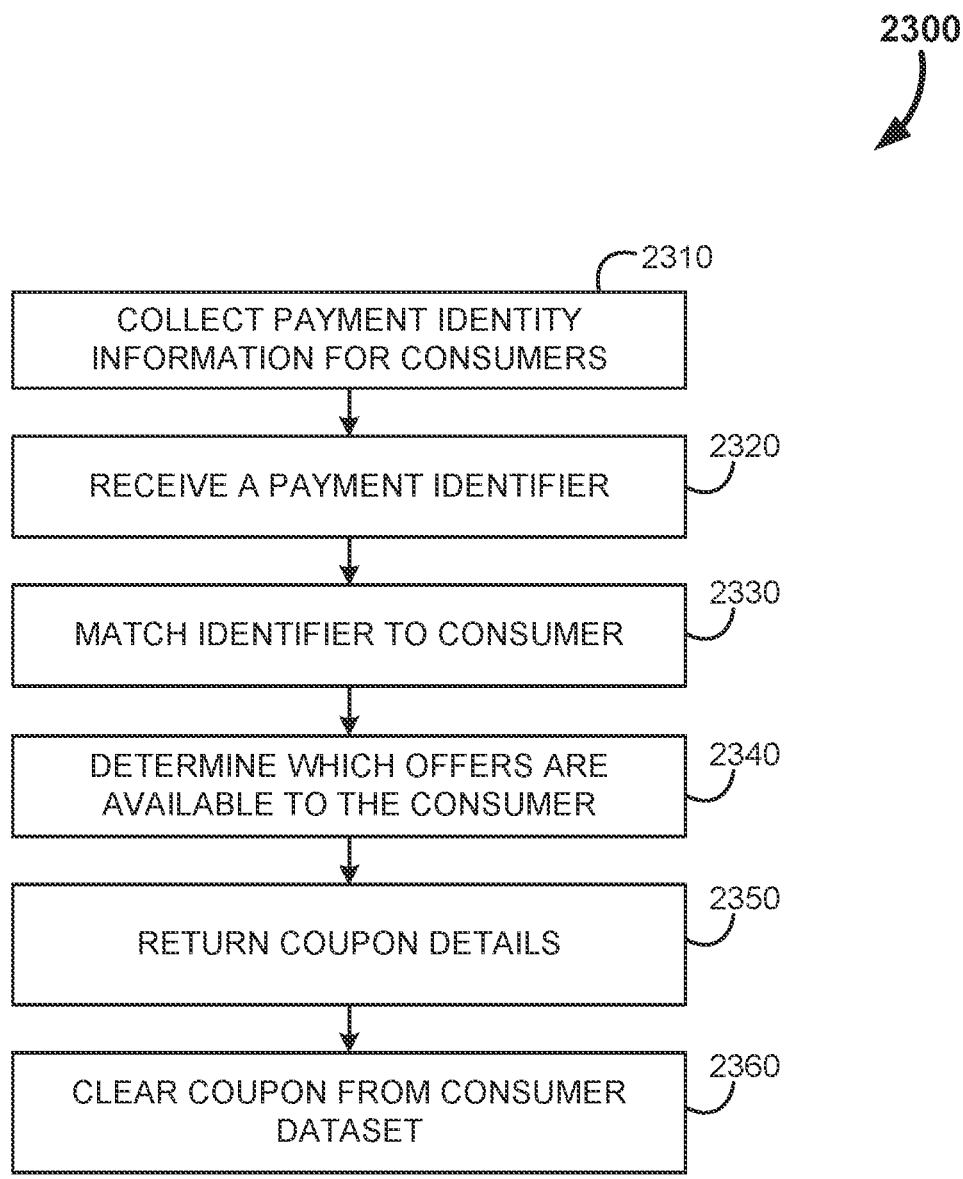
FIG. 23 shows, in accordance with some embodiments, a flowchart of an example method for offer redemption.

On the offer redemption system the following process takes place, as seen in reference to FIG. 23, shown generally at 2300. The payment identifier from the consumer is collected (at 2310) and an expansive dataset correlating this payment ID to a consumer identity is performed. The correlation is based upon pharmacy identification (if available), and transaction log information linking the payment number to a loyalty card. Additional data such as social media feeds, or public records may be employed in determining household members and correlating the individuals to a set of offers and other promotions.

Thus, when a consumer makes a payment at a participating retailer, the payment data is transmitted and received by the system (at 2320) which in turn is used to match to an identity in the previously generated dataset. This matching allows offers that are available to the consumer to be retrieved (at 2340) and returned (at 2350) to the payment gateway (and ultimately the retailer). Once confirmation is received that the coupon has been properly applied, the redemption system may clear the offer from the dataset to avoid redundant usage/fraudulent activity (at 2360).

IV. System Embodiments

Figure 24A:
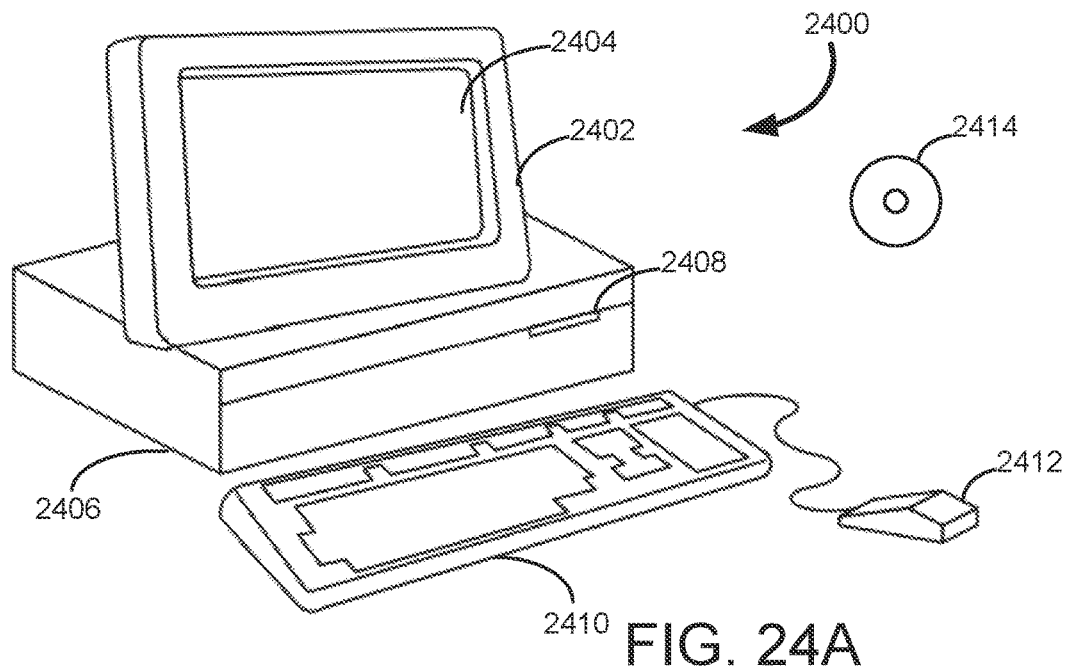
FIGS. 24A and 24B are example computer systems capable of implementing the systems for offer generation and redemption.
Figure 24B:
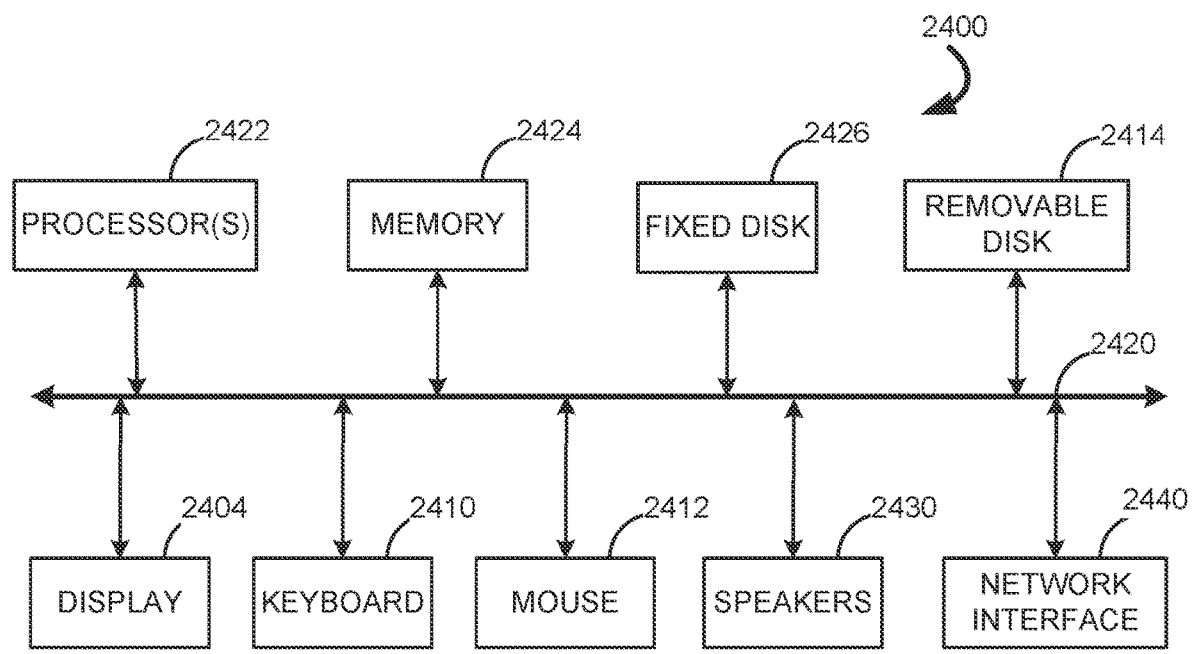

Now that the systems and methods for the optimization of promotional variables and bae prices in a physical retail setting have been described, attention shall now be focused upon apparatuses capable of executing the above functions in real-time. To facilitate this discussion, FIGS. 24A and 24B illustrate a Computer System 2400, which is suitable for implementing embodiments of the present invention. FIG. 24A shows one possible physical form of the Computer System 2400. Of course, the Computer System 2400 may have many physical forms ranging from a printed circuit board, an integrated circuit, and a small handheld device up to a huge super computer. Computer system 2400 may include a Monitor 2402, a Display 2404, a Housing 2406, a storage Drive 2408, a Keyboard 2410, and a Mouse 2412. Medium 2414 is a computer-readable medium used to transfer data to and from Computer System 2400.

FIG. 24B is an example of a block diagram for Computer System 2400. Attached to System Bus 2420 are a wide variety of subsystems. Processor(s) 2422 (also referred to as central processing units, or CPUs) are coupled to storage devices, including Memory 2424. Memory 2424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Medium 2426 may also be coupled bi-directionally to the Processor 2422; it provides additional data storage capacity and may also include any of the computer-readable media described below. Fixed Medium 2426 may be used to store programs, data, and the like and is typically a secondary storage medium (such as a hard disk) that is slower than primary storage. It will be appreciated that the information retained within Fixed Medium 2426 may, in appropriate cases, be incorporated in standard fashion as virtual memory in Memory 2424. Removable Medium 2414 may take the form of any of the computer-readable media described below.

Processor 2422 is also coupled to a variety of input/output devices, such as Display 2404, Keyboard 2410, Mouse 2412 and Speakers 2430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2422 optionally may be coupled to another computer or telecommunications network using Network Interface 2440. With such a Network Interface 2440, it is contemplated that the Processor 2422 might receive information from the network, or might output information to the network in the course of performing the above-described promotion offer generation and redemption. Furthermore, method embodiments of the present invention may execute solely upon Processor 2422 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2400 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method, performed by a computing system comprising a processor and a non-transitory computer-readable medium storing instructions for the method, comprising:
    receiving, by the computing system, a proposed offer from a manufacturer, wherein the proposed offer includes a number of consumers to target, a product, and an offer structure;
    accessing, by the computing system, transaction logs describing a plurality of transactions completed by a plurality of consumers with a retailer;
    computing, by the computing system, a set of metrics for each consumer of the plurality of consumers based on the accessed transaction logs, wherein the set of metrics for a consumer of the plurality of consumers comprises:
        a first metric indicating whether the consumer has previously purchased the product associated with the proposed offer;
        a second metric indicating a price elasticity of the consumer for the product; and
        a third metric indicating how frequently the consumer purchases the product;
    receiving, by the computing system, a set of shopper weight values from the retailer, wherein each shopper weight value of the set of shopper weight values corresponds to a metric of the set of metrics;
    calculating, by the computing system, a return on investment (ROI) value for each consumer of the plurality of consumers, wherein calculating the ROI value for a consumer comprises multiplying each metric of the set of metrics associated with the consumer by a corresponding shopper weight value of the set of shopper weight values;
    generating, by the computing system, an ROI distribution comprising a plurality of consumer buckets, wherein each consumer bucket of the plurality of consumer buckets comprises consumers of the plurality of consumers associated with ROI values that are within a percentile range of ROI values, and wherein each consumer bucket of the plurality of consumer buckets comprises the same number of consumers;
    selecting, by the computing system, a subset of the plurality of consumer buckets associated with the largest percentile ranges of the plurality of consumer buckets, wherein a number of consumer buckets selected for the subset of consumer buckets is based on the number of consumers to target associated with the proposed offer;

calculating, by the computing system, an average ROI value based on the ROI values associated with consumers in the selected subset of consumer buckets.

2. The method of claim 1, further comprising:
calculating a cost of the proposed offer for a manufacturer based on the number of consumers to target, the product, and the offer structure of the proposed offer;
transmitting the proposed offer and the calculated cost to the manufacturer; and
receiving a selection of the offer for deployment.

3. The method of claim 1, further comprising:
calculating a predicted redemption rate, predicted sales, predicted incremental sales, and gross margin for the proposed offer based on the accessed transaction logs; and
transmitting the proposed offer, predicted redemption rate, predicted sales, predicted incremental sales, and gross margin to the manufacturer.

4. The method of claim 1, further comprising:
computing a first discount percentage and a second discount percentage for the proposed offer based on the average ROI value, wherein the first discount percentage indicates percentage discount to be paid by the retailer and wherein the second discount percentage indicates a percentage discount to be paid by the manufacturer;
transmitting the first discount percentage to the retailer; and
transmitting the second discount percentage to the manufacturer.

5. The method of claim 4, wherein computing the first discount percentage comprises:
applying a linear function to the average ROI value.

6. The method of claim 4, further comprising:
computing the first discount percentage based on a threshold percentage value, wherein the threshold value is based on a discount value of the proposed offer.

7. The method of claim 6, wherein the threshold percentage value is 10% of the discount value of the proposed offer.

8. The method of claim 1, further comprising:
transmitting the proposed offer and the average ROI value to a manufacturer;
receiving proposed changes to the offer structure of the proposed offer from the manufacturer; and
optimizing the offer structure of the proposed offer based on the proposed changes and the average ROI value of the proposed offer.

9. The method of claim 1, further comprising:
delivering the proposed offer to another plurality of consumers based on the average ROI value.

10. The method of claim 9, wherein delivering the proposed offer to another plurality of consumers comprises:
identifying consumers that are in the selected subset of consumer buckets.

11. A non-transitory computer-readable medium storing instructions that, when executed by a processor, cause the processor to:
receive a proposed offer from a manufacturer, wherein the proposed offer includes a number of consumers to target, a product, and an offer structure;
access transaction logs describing a plurality of transactions completed by a plurality of consumers with a retailer;
compute a set of metrics for each consumer of the plurality of consumers based on the accessed transaction logs, wherein the set of metrics for a consumer of the plurality of consumers comprises:
a first metric indicating whether the consumer has previously purchased the product associated with the proposed offer;
a second metric indicating a price elasticity of the consumer for the product; and
a third metric indicating how frequently the consumer purchases the product;
receive a set of shopper weight values from the retailer, wherein each shopper weight value of the set of shopper weight values corresponds to a metric of the set of metrics;
calculate a return on investment (ROI) value for each consumer of the plurality of consumers, wherein calculating the ROI value for a consumer comprises multiplying each metric of the set of metrics associated with the consumer by a corresponding shopper weight value of the set of shopper weight values;
generate an ROI distribution comprising a plurality of consumer buckets, wherein each consumer bucket of the plurality of consumer buckets comprises consumers of the plurality of consumers associated with ROI values that are within a percentile range of ROI values, and wherein each consumer bucket of the plurality of consumer buckets comprises the same number of consumers;
select a subset of the plurality of consumer buckets associated with the largest percentile ranges of the plurality of consumer buckets, wherein a number of consumer buckets selected for the subset of consumer buckets is based on the number of consumers to target associated with the proposed offer;
calculate an average ROI value based on the ROI values associated with consumers in the selected subset of consumer buckets.

12. The non-transitory computer-readable medium of claim 11, further storing instructions that, when executed by a processor, cause the processor to:
calculate a cost of the proposed offer for a manufacturer based on the number of consumers to target, the product, and the offer structure of the proposed offer;
transmit the proposed offer and the calculated cost to the manufacturer; and
receive a selection of the offer for deployment.

13. The non-transitory computer-readable medium of claim 11, further storing instructions that, when executed by a processor, cause the processor to:
calculate a predicted redemption rate, predicted sales, predicted incremental sales, and gross margin for the proposed offer based on the accessed transaction logs; and
transmit the proposed offer, predicted redemption rate, predicted sales, predicted incremental sales, and gross margin to the manufacturer.

14. The non-transitory computer-readable medium of claim 11, further storing instructions that, when executed by a processor, cause the processor to:
compute a first discount percentage and a second discount percentage for the proposed offer based on the average ROI value, wherein the first discount percentage indicates percentage discount to be paid by the retailer and wherein the second discount percentage indicates a percentage discount to be paid by the manufacturer;
transmit the first discount percentage to the retailer; and
transmitting the second discount percentage to the manufacturer.

15. The non-transitory computer-readable medium of claim 14, wherein the instructions for computing the first discount percentage comprise instructions that cause a processor to:
apply a linear function to the average ROI value.

16. The non-transitory computer-readable medium of claim 14, further storing instructions that, when executed by a processor, cause the processor to:
compute the first discount percentage based on a threshold percentage value, wherein the threshold value is based on a discount value of the proposed offer.

17. The non-transitory computer-readable medium of claim 16, wherein the threshold percentage value is 10% of the discount value of the proposed offer.

18. The non-transitory computer-readable medium of claim 11, further storing instructions that, when executed by a processor, cause the processor to:
transmit the proposed offer and the average ROI value to a manufacturer;
receive proposed changes to the offer structure of the proposed offer from the manufacturer; and
optimize the offer structure of the proposed offer based on the proposed changes and the average ROI value of the proposed offer.

19. The non-transitory computer-readable medium of claim 11, further storing instructions that, when executed by a processor, cause the processor to:
deliver the proposed offer to another plurality of consumers based on the average ROI value.

20. A system comprising:
a processor; and
a non-transitory computer-readable medium storing instructions that, when executed by the processor, cause the processor to:
receive a proposed offer from a manufacturer, wherein the proposed offer includes a number of consumers to target, a product, and an offer structure;
access transaction logs describing a plurality of transactions completed by a plurality of consumers with a retailer;
compute a set of metrics for each consumer of the plurality of consumers based on the accessed transaction logs, wherein the set of metrics for a consumer of the plurality of consumers comprises:
a first metric indicating whether the consumer has previously purchased the product associated with the proposed offer;
a second metric indicating a price elasticity of the consumer for the product; and
a third metric indicating how frequently the consumer purchases the product;
receive a set of shopper weight values from the retailer, wherein each shopper weight value of the set of shopper weight values corresponds to a metric of the set of metrics;
calculate a return on investment (ROI) value for each consumer of the plurality of consumers, wherein calculating the ROI value for a consumer comprises multiplying each metric of the set of metrics associated with the consumer by a corresponding shopper weight value of the set of shopper weight values;
generate an ROI distribution comprising a plurality of consumer buckets, wherein each consumer bucket of the plurality of consumer buckets comprises consumers of the plurality of consumers associated with ROI values that are within a percentile range of ROI values, and wherein each consumer bucket of the plurality of consumer buckets comprises the same number of consumers;
select a subset of the plurality of consumer buckets associated with the largest percentile ranges of the plurality of consumer buckets, wherein a number of consumer buckets selected for the subset of consumer buckets is based on the number of consumers to target associated with the proposed offer;
calculate an average ROI value based on the ROI values associated with consumers in the selected subset of consumer buckets.

\* \* \* \* \*